(12) United States Patent
Hang et al.

(10) Patent No.: US 11,870,525 B2
(45) Date of Patent: Jan. 9, 2024

(54) CHANNEL MEASUREMENT CONFIGURATION METHOD AND COMMUNICATIONS APPARATUS

(71) Applicant: Huawei Technologies Co., Ltd., Shenzhen (CN)

(72) Inventors: Haicun Hang, Shanghai (CN); Shibin Ge, Shanghai (CN); Hongzhe Shi, Shanghai (CN); Xiaohan Wang, Shanghai (CN); Liuliu Ji, Shanghai (CN); Xiaoyan Bi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 142 days.

(21) Appl. No.: 17/337,156

(22) Filed: Jun. 2, 2021

(65) Prior Publication Data

US 2021/0288707 A1 Sep. 16, 2021

Related U.S. Application Data

(63) Continuation of application No. PCT/CN2019/122463, filed on Dec. 2, 2019.

(30) Foreign Application Priority Data

Dec. 3, 2018 (CN) .......................... 201811467380.4

(51) Int. Cl.
*H04B 7/06* (2006.01)
*H04B 17/336* (2015.01)
(Continued)

(52) U.S. Cl.
CPC ......... *H04B 7/0626* (2013.01); *H04B 17/336* (2015.01); *H04L 5/0051* (2013.01); *H04W 24/10* (2013.01)

(58) Field of Classification Search
CPC ... H04B 7/0626; H04B 17/336; H04L 5/0051; H04W 24/10
See application file for complete search history.

(56) References Cited

U.S. PATENT DOCUMENTS

2013/0196675 A1 8/2013 Xiao et al.
2015/0131563 A1* 5/2015 Guo .......................... H04B 7/04
370/329

(Continued)

FOREIGN PATENT DOCUMENTS

CN 108270513 A 7/2018
CN 108270525 A 7/2018

(Continued)

OTHER PUBLICATIONS

Huawei, HiSilicon, "Remaining issues for CS framework," 3GPP TSG RAN WG1 Meeting #91, R1-1719426, total 8 pages, 3rd Generation Partnership Project, Valbonne, France (Nov. 27-Dec. 1, 2017).

(Continued)

*Primary Examiner* — Deepa Belur
(74) *Attorney, Agent, or Firm* — Leydig, Voit & Mayer, Ltd.

(57) ABSTRACT

This application provides a channel measurement configuration method and a communications apparatus. The method includes: receiving, by a terminal device, a measurement configuration, where the measurement configuration includes a plurality of resource settings, and the plurality of resource settings include a plurality of resource settings for channel measurement and a plurality of resource settings for interference measurement; receiving, by the terminal device, channel state information reference signals CSI-RSs on resources configured in the plurality of resource settings; and generating, by the terminal device, a CSI group based on the CSI-RSs, where the CSI group includes one or more (Continued)

pieces of CSI. In embodiments of this application, a plurality of resource settings for channel measurement and a plurality of resource settings for interference measurement are associated in one report setting.

18 Claims, 9 Drawing Sheets

(51) Int. Cl.
*H04L 5/00* (2006.01)
*H04W 24/10* (2009.01)

(56) References Cited

U.S. PATENT DOCUMENTS

| | | | | |
|---|---|---|---|---|
| 2018/0152858 | A1* | 5/2018 | Chen | H04B 7/0636 |
| 2019/0109626 | A1* | 4/2019 | Park | H04B 7/0636 |
| 2020/0007299 | A1* | 1/2020 | Han | H04L 5/0094 |
| 2020/0014514 | A1* | 1/2020 | Gao | H04W 72/04 |
| 2021/0184819 | A1* | 6/2021 | Takeda | H04W 24/10 |
| 2022/0376876 | A1* | 11/2022 | Song | H04L 5/0035 |
| 2023/0125760 | A1* | 4/2023 | Fan | H04B 7/063 370/252 |

FOREIGN PATENT DOCUMENTS

| | | | | |
|---|---|---|---|---|
| CN | 108289004 | A | 7/2018 | |
| CN | 108810932 | A | 11/2018 | |
| CN | 108282321 | B * | 3/2022 | H04B 7/0626 |
| EP | 3687215 | B1 * | 1/2023 | H04L 5/00 |
| WO | 2018028256 | A1 | 2/2018 | |
| WO | WO-2018173002 | A1 * | 9/2018 | H04L 5/00 |
| WO | 2018202181 | A1 | 11/2018 | |
| WO | WO-2018203307 | A1 * | 11/2018 | H04B 17/318 |
| WO | WO-2020003443 | A1 * | 1/2020 | |
| WO | WO-2020059146 | A1 * | 3/2020 | |

OTHER PUBLICATIONS

"COMP Joint Transmission using Multiple Redundancy Versions," 3GPP TSG RAN WG1 Meeting #65, Barcelona, Spain, R1-111347, Total 7 pages, 3rd Generation Partnership Project, Valbonne, France (May 9-13, 2011).

Huawei, HiSilicon, "On aperiodic CSI-RS triggering," 3GPP TSG RAN WG1 Meeting #91, R1-1719813, total 5 pages, 3rd Generation Partnership Project, Valbonne, France (Nov. 27-Dec. 1, 2017).

Zte et al., "Remaining details on CSI measurement," 3GPP TSG RAN WG1 Meeting #92, Athens, Greece, R1-1801579, total 6 pages, 3rd Generation Partnership Project, Valbonne, France (Feb. 26-Mar. 2, 2018).

"3rd Generation Partnership Project; Technical Specification Group Radio Access Network; NR; Physical channels and modulation (Release 15)," 3GPP TS 38.211 V15.3.0, total 96 pages, 3rd Generation Partnership Project, Valbonne, France (Sep. 2018).

Huawei, HiSilicon, "Remaining issues for CSI framework," 3GPP TSG RAN WG1 Meeting #91, R1-1719426, total 8 pages, 3rd Generation Partnership Project, Valbonne, France (Nov. 27-Dec. 1, 2017).

* cited by examiner

CHANNEL MEASUREMENT CONFIGURATION METHOD AND COMMUNICATIONS APPARATUS

CROSS-REFERENCE TO RELATED APPLICATIONS

This application is a continuation of International Application No. PCT/CN2019/122463, filed on Dec. 2, 2019, which claims priority to Chinese Patent Application No. 201811467380.4, filed on Dec. 3, 2018. The disclosures of the aforementioned applications are hereby incorporated by reference in their entireties.

TECHNICAL FIELD

This application relates to the communications field, and more specifically, to a channel measurement configuration method and a communications apparatus.

BACKGROUND

In an existing communications system, signal quality of a terminal device located at a cell edge is usually improved by using a coordinated multipoint transmission/reception (CoMP) technology or a further enhanced coordinated multipoint transmission/reception (FeCoMP) technology. To be specific, a plurality of network devices communicate with the terminal device in a diversity manner, to improve reliability of communication of the terminal device.

In a CoMP/FeCoMP-based communications technology, before data is transmitted between a terminal device and a plurality of network devices, the terminal device needs to measure a channel state of each network device based on a channel state information reference signal (CSI-RS) sent by each network device, and returns channel state information (CSI) of each network device, so that the plurality of network devices select a proper transmission parameter (for example, a precoding matrix or a modulation and coding scheme) based on respective CSI to transmit data to the terminal device.

However, in the foregoing mechanism of measuring the channel state by the terminal device, a diversity gain during transmission between the terminal device and the plurality of network devices is not considered. As a result, the CSI fed back by the terminal device is improper.

SUMMARY

This application provides a channel measurement configuration method, a communications apparatus, a network device, and a terminal device, to improve accuracy of CSI fed back by the terminal device.

According to a first aspect, a channel measurement configuration method is provided, including:
receiving, by a terminal device, a measurement configuration, where the measurement configuration includes a plurality of resource settings, and the plurality of resource settings include a plurality of resource settings for channel measurement and a plurality of resource settings for interference measurement;
receiving, by the terminal device, channel state information reference signals CSI-RSs on resources configured in the plurality of resource settings; and
generating, by the terminal device, a CSI group based on the CSI-RSs, where the CSI group includes one or more pieces of CSI.

Optionally, each piece of CSI in the CSI group is used to indicate a measurement result of joint measurement.

In this embodiment of this application, a plurality of resource settings for channel measurement and a plurality of resource settings for interference measurement are associated in one report setting, so that the terminal device can perform joint measurement based on CSI-RSs received on resources configured in the plurality of resource settings for channel measurement and the plurality of resource settings for interference measurement. This helps improve accuracy of channel state measurement of the terminal device in a coordinated transmission scenario. This avoids that in the coordinated transmission scenario, during channel state measurement based on a conventional resource configuration manner, the terminal device can only calculate a channel state for CSI-RSs received on a resource configured in each resource setting for channel measurement and a resource configured in a resource setting for interference measurement that corresponds to the resource setting for channel measurement, which ignores a transmission gain brought when information is transmitted to the terminal device based on coordinated transmission.

For example, in the coordinated transmission scenario, during channel state measurement based on the configuration manner in this embodiment of this application, the terminal device can perform, based on the CSI-RSs transmitted on the resources configured in the plurality of resource settings, joint measurement on channel states of a plurality of network devices participating in coordinated transmission, and add a joint measurement result to the CSI group. This helps improve accuracy of channel state measurement of the terminal device in the coordinated transmission scenario. This avoids that during channel state measurement based on the conventional resource configuration manner, the terminal device can only separately measure channel quality of the plurality of network devices participating in coordinated transmission, which ignores a transmission gain brought by the plurality of network devices based on the coordinated transmission.

In an embodiment, the plurality of resource settings for interference measurement include one first resource setting for interference measurement, and the first resource setting for interference measurement is used to configure a resource set used to transmit a zero-power ZP CSI-RS.

In this embodiment of this application, one first resource setting for interference measurement is configured in the plurality of resource settings for interference measurement to transmit a ZP CSI-RS, to reduce a quantity of resources configured in the plurality of resource settings for interference measurement, so that a saved resource is configured for another purpose, thereby improving resource utilization.

In an embodiment, the plurality of resource settings for interference measurement include a plurality of second resource settings for interference measurement, the second resource setting for interference measurement is used to configure a resource set used to transmit a non-zero-power NZP CSI-RS, the measurement configuration includes a plurality of report settings, different report settings in the plurality of report settings are associated with different resource settings in the plurality of second resource settings for interference measurement, and different report settings in the plurality of report settings are associated with different resource settings in the plurality of resource settings for channel measurement.

In this embodiment of this application, a plurality of report settings are respectively associated with a plurality of resource settings for channel measurement and a plurality of resource settings for interference measurement, to reduce changes to an existing configuration manner. This helps improve a degree of combination between this embodiment of this application and the existing configuration manner.

In an embodiment, the plurality of report settings include a target report setting and another report setting, and
the method further includes:
receiving, by the terminal device, the first indication information, where the first indication information is used to indicate that there is a correspondence between the target report setting and the another report setting, and the first indication information and the measurement configuration are transmitted separately or together.

That there is a correspondence between the target report setting and the another report setting may be replaced with that there is an association relationship between the target report setting and the another report setting. In other words, the target report setting and the another report setting are associated and configured as report settings required for joint measurement.

Optionally, the first indication information may be carried in the target report setting, and is used to indicate the another report setting in the measurement configuration.

In this embodiment of this application, the first indication information is carried in the target setting, to indicate the another report setting, so that the terminal device may determine, based on the first indication information, that there is an association relationship between the target report setting and the another report setting. This helps reduce a quantity of report settings indicated by the first indication information (that is, the target report setting does not need to be indicated), and helps reduce overheads caused by indication information transmission.

In an embodiment, the first indication information is an identifier of the another report setting.

In an embodiment, each of the plurality of report settings carries indication information used to indicate a redundancy version RV.

In this embodiment of this application, each report setting carries indication information used to indicate an RV, so that a correspondence between the report setting and the RV is established. In this way, the terminal device learns the RV used to measure a channel state based on each report setting, thereby simplifying complexity of joint measurement performed by the terminal device.

In an embodiment, the measurement configuration includes a first report setting, the first report setting is associated with the plurality of resource settings for channel measurement, and the first report setting is associated with the plurality of resource settings for interference measurement.

In this embodiment of this application, one first report setting is associated with the plurality of resource settings for interference measurement and the plurality of resource settings for channel measurement, to simplify an association relationship between the report setting, the resource setting for interference measurement, and the resource setting for channel measurement.

In an embodiment, the plurality of resource settings for interference measurement include a target resource setting for interference measurement and another resource setting for interference measurement, and
the method further includes:
receiving, by the terminal device, second indication information, where the second indication information is used to indicate that there is a correspondence between a resource set in the target resource setting for interference measurement and a resource set in the another resource setting for interference measurement, and the second indication information and the measurement configuration are transmitted separately or together.

That there is a correspondence between a resource set in the target resource setting for interference measurement and a resource set in the another resource setting for interference measurement may be replaced with that there is an association relationship between a resource set in the target resource setting for interference measurement and a resource set in the another resource setting for interference measurement. In other words, a resource set in the target resource setting for interference measurement and a resource set in the another resource setting for interference measurement are associated and configured as resource sets required for joint measurement.

Optionally, the second indication information may be carried in the target resource setting for interference measurement, and is used to indicate the another resource setting for interference measurement in the measurement configuration.

In this embodiment of this application, the second indication information is carried in the target resource setting for interference measurement, to indicate the plurality of resource settings for interference measurement. This helps reduce a quantity of resource settings for interference measurement that are indicated by the second indication information (that is, the target resource setting for interference measurement does not need to be indicated), and helps reduce overheads caused by indication information transmission.

In an embodiment, the second indication information is an identifier of a resource set that is in the another resource setting for interference measurement and that is used to transmit a CSI-RS.

In an embodiment, the plurality of resource settings for channel measurement include a target resource setting for channel measurement and another resource setting for channel measurement, and
the method further includes:
receiving, by the terminal device, third indication information, where the third indication information is used to indicate that there is a correspondence between a resource set in the target resource setting for channel measurement and a resource set in the another resource setting for channel measurement, and the third indication information and the measurement configuration are transmitted separately or together.

That there is a correspondence between a resource set in the target resource setting for channel measurement and a resource set in the another resource setting for channel measurement may be replaced with that there is an association relationship between a resource set in the target resource setting for channel measurement and a resource set in the another resource setting for channel measurement. In other words, a resource set in the target resource setting for channel measurement and a resource set in the another resource setting for channel measurement are associated and configured as resource sets required for joint measurement.

Optionally, the third indication information may be carried in the target resource setting for channel measurement, and is used to indicate the another resource setting for channel measurement in the measurement configuration.

In this embodiment of this application, the third indication information is carried in the target resource setting for channel measurement, to indicate the plurality of resource settings for channel measurement. This helps reduce a quantity of resource settings for channel measurement that are indicated by the third indication information (that is, the target resource setting for channel measurement does not need to be indicated), and helps reduce overheads caused by indication information transmission.

In an embodiment, the third indication information is an identifier of a resource set that is in the another resource setting for channel measurement and that is used to transmit a CSI-RS.

In an embodiment, each of the plurality of resource settings for channel measurement carries indication information used to indicate an RV, and/or
  each of the plurality of resource settings for interference measurement carries indication information used to indicate an RV.

In this embodiment of this application, each resource setting for channel measurement carries indication information used to indicate an RV, so that a correspondence between the resource setting for channel measurement and the RV is established. In this way, the terminal device learns the RV used to measure a channel state based on each resource setting for channel measurement, thereby simplifying complexity of joint measurement performed by the terminal device.

In this embodiment of this application, each interference measurement resource setting carries indication information used to indicate an RV, so that a correspondence between the interference measurement resource setting and the RV is established. In this way, the terminal device learns the RV used to measure a channel state based on each interference measurement resource setting, thereby simplifying complexity of joint measurement performed by the terminal device.

In an embodiment, the generating, by the terminal device, a CSI group based on the CSI-RSs includes:
  generating, by the terminal device, the CSI group based on the CSI-RSs and a combination of one or more RVs.

In this embodiment of this application, the terminal device may generate the CSI group based on the combination of RVs. In other words, in a process of generating the CSI group, a transmission gain brought by the RVs is considered, thereby improving accuracy of the CSI group.

In an embodiment, the method further includes:
  sending, by the terminal device, the CSI group and fourth indication information, where the fourth indication information is used to indicate the combination of RVs used to generate the one or more pieces of CSI.

According to a second aspect, a channel measurement configuration method is provided, including:
  receiving, by a terminal device, a measurement configuration, where the measurement configuration includes a plurality of resource sets used to transmit a channel state information reference signal CSI-RS;
  receiving, by the terminal device, CSI-RSs on resources included in the plurality of resource sets; and
  generating, by the terminal device, a CSI group based on the CSI-RSs, where the CSI group includes one or more pieces of CSI.

In this embodiment of this application, a plurality of resource sets are associated in one measurement configuration, so that the terminal device can perform joint measurement based on CSI-RSs received on resources included in the plurality of resource sets. This helps improve accuracy of channel state measurement of the terminal device in a coordinated transmission scenario. This avoids that in the coordinated transmission scenario, during channel state measurement based on a conventional resource configuration manner, the terminal device can only calculate a channel state for CSI-RSs received on a resource configured in each resource setting for channel measurement and a resource configured in a resource setting for interference measurement that corresponds to the resource setting for channel measurement, which ignores a transmission gain brought when information is transmitted to the terminal device based on coordinated transmission.

For example, in the coordinated transmission scenario, during channel state measurement based on the configuration manner in this embodiment of this application, the terminal device can perform, based on CSI-RSs transmitted on the resources included in the plurality of resource sets by a plurality of network devices participating in coordinated transmission, joint measurement on channel states of the plurality of network devices, and add a joint measurement result to the CSI group. This helps improve accuracy of channel state measurement of the terminal device in the coordinated transmission scenario. This avoids that during channel state measurement based on the conventional resource configuration manner, the terminal device can only separately measure channel quality of the plurality of network devices participating in coordinated transmission, which ignores a transmission gain brought by the plurality of network devices based on the coordinated transmission.

In an embodiment, the measurement configuration includes a first report setting, the first report setting is associated with a resource setting for channel measurement and a resource setting for interference measurement, and the resource setting for channel measurement and the resource setting for interference measurement include the plurality of resource sets.

It should be noted that the "first report setting" is also referred to as a "second report setting" to distinguish the "first report setting" from the "first report setting" in the first aspect.

In this embodiment of this application, one report setting is associated with a plurality of resource sets by using one resource setting for channel measurement and one resource setting for interference measurement, to simplify complexity of an association relationship.

In an embodiment, the resource setting for interference measurement includes a resource set used to transmit a zero-power ZP CSI-RS.

In this embodiment of this application, a resource set used to transmit a zero-power ZP CSI-RS is configured in the resource setting for interference measurement, to reduce a quantity of resources configured in a plurality of resource settings for interference measurement, so that a saved resource is configured for another purpose, thereby improving resource utilization.

In an embodiment, resource sets included in the resource setting for channel measurement include a target resource set and another resource set, and
  the method further includes:
    receiving, by the terminal device, first indication information, where the first indication information is used to indicate that there is a correspondence between the target resource set and the another resource set, and the first indication information and the measurement configuration are transmitted separately or together.

It should be noted that the "first indication information" is different from the "first indication information" in the first aspect, and is also referred to as "fifth indication information" below for ease of distinguishing.

Optionally, the fifth indication information may be carried in the target resource set, and is used to indicate the another resource set in the measurement configuration.

In this embodiment of this application, the fifth indication information is carried in the target resource set, to indicate the plurality of resource sets. This helps reduce a quantity of resource sets indicated by the fifth indication information (that is, the target resource set does not need to be indicated), and helps reduce overheads caused by indication information transmission.

In an embodiment, each of the plurality of resource sets included in the resource setting for channel measurement carries indication information used to indicate a redundancy version RV.

In this embodiment of this application, each resource set carries indication information used to indicate an RV, so that a correspondence between the resource set and the RV is established. In this way, the terminal device learns the RV used to measure a channel state based on each resource set, thereby simplifying complexity of joint measurement performed by the terminal device.

In an embodiment, the generating, by the terminal device, a CSI group based on the CSI-RSs includes:
  generating, by the terminal device, the CSI group based on the CSI-RSs and a combination of one or more RVs.
In an embodiment, the method further includes:
  sending, by the terminal device, the CSI group and second indication information, where the second indication information is used to indicate the combination of RVs used to generate the one or more pieces of CSI.

It should be noted that the "second indication information" is also referred to as "sixth indication information".

According to a third aspect, a channel measurement configuration method is provided, including:
  generating, by a network device, a measurement configuration, where the measurement configuration includes a plurality of resource settings, and the plurality of resource settings include a plurality of resource settings for channel measurement and a plurality of resource settings for interference measurement; and
  sending, by the network device, the measurement configuration to a terminal device.

In this embodiment of this application, a plurality of resource settings for channel measurement and a plurality of resource settings for interference measurement are associated in one report setting, so that the terminal device can perform joint measurement based on CSI-RSs received on resources configured in the plurality of resource settings for channel measurement and the plurality of resource settings for interference measurement. This helps improve accuracy of channel state measurement of the terminal device in a coordinated transmission scenario. This avoids that in the coordinated transmission scenario, during channel state measurement based on a conventional resource configuration manner, the terminal device can only calculate a channel state for CSI-RSs received on a resource configured in each resource setting for channel measurement and a resource configured in a resource setting for interference measurement that corresponds to the resource setting for channel measurement, which ignores a transmission gain brought when information is transmitted to the terminal device based on coordinated transmission.

For example, in the coordinated transmission scenario, during channel state measurement based on the configuration manner in this embodiment of this application, the terminal device can perform, based on the CSI-RSs transmitted on the resources configured in the plurality of resource settings, joint measurement on channel states of a plurality of network devices participating in coordinated transmission, and add a joint measurement result to a CSI group. This helps improve accuracy of channel state measurement of the terminal device in the coordinated transmission scenario. This avoids that during channel state measurement based on the conventional resource configuration manner, the terminal device can only separately measure channel quality of the plurality of network devices participating in coordinated transmission, which ignores a transmission gain brought by the plurality of network devices based on the coordinated transmission.

In an embodiment, the plurality of resource settings for interference measurement include a resource set used to transmit a zero-power ZP CSI-RS.

In this embodiment of this application, one first resource setting for interference measurement is configured in the plurality of resource settings for interference measurement to transmit a ZP CSI-RS, to reduce a quantity of resources configured in the plurality of resource settings for interference measurement, so that a saved resource is configured for another purpose, thereby improving resource utilization.

In an embodiment, the measurement configuration includes a plurality of report settings, different report settings in the plurality of report settings are associated with different resource settings in the plurality of resource settings for channel measurement, and different report settings in the plurality of report settings are associated with different resource settings in the plurality of resource settings for interference measurement.

In this embodiment of this application, a plurality of report settings are respectively associated with a plurality of resource settings for channel measurement and a plurality of resource settings for interference measurement, to reduce changes to an existing configuration manner. This helps improve a degree of combination between this embodiment of this application and the existing configuration manner.

In an embodiment, the plurality of report settings include a target report setting and another report setting, and
  the method further includes:
  sending, by the network device, first indication information to the terminal device, where the first indication information is used to indicate that there is a correspondence between the target report setting and the another report setting, and the first indication information and the measurement configuration are transmitted separately or together.

That there is a correspondence between the target report setting and the another report setting may be replaced with that there is an association relationship between the target report setting and the another report setting. In other words, the target report setting and the another report setting are associated and configured as report settings required for joint measurement.

Optionally, the first indication information may be carried in the target report setting, and is used to indicate the another report setting in the measurement configuration.

In this embodiment of this application, the first indication information is carried in the target report setting, to indicate the plurality of report settings. This helps reduce a quantity of report settings indicated by the first indication information (that is, the target report setting does not need to be indicated), and helps reduce overheads caused by indication information transmission.

In an embodiment, the first indication information is an identifier of the another report setting.

In an embodiment, each of the plurality of report settings carries indication information used to indicate a redundancy version RV, for example, a version number of the RV.

In this embodiment of this application, each report setting carries indication information used to indicate an RV, so that a correspondence between the report setting and the RV is established. In this way, the terminal device learns the RV used to measure a channel state based on each report setting, thereby simplifying complexity of joint measurement performed by the terminal device.

In an embodiment, the measurement configuration includes a first report setting, the first report setting is associated with the plurality of resource settings for channel measurement, and the first report setting is associated with the plurality of resource settings for interference measurement.

In this embodiment of this application, one first report setting is associated with the plurality of resource settings for interference measurement and the plurality of resource settings for channel measurement, to simplify an association relationship between the report setting, the resource setting for interference measurement, and the resource setting for channel measurement.

In an embodiment, the plurality of resource settings for interference measurement include a target resource setting for interference measurement and another resource setting for interference measurement, and the method further includes:
sending, by the network device, second indication information to the terminal device, where the second indication information is used to indicate that there is a correspondence between a resource set in the target resource setting for interference measurement and a resource set in the another resource setting for interference measurement, and the second indication information and the measurement configuration are transmitted separately or together.

That there is a correspondence between a resource set in the target resource setting for interference measurement and a resource set in the another resource setting for interference measurement may be replaced with that there is an association relationship between a resource set in the target resource setting for interference measurement and a resource set in the another resource setting for interference measurement. In other words, a resource set in the target resource setting for interference measurement and a resource set in the another resource setting for interference measurement are associated and configured as resource sets required for joint measurement.

Optionally, the second indication information may be carried in the target resource setting for interference measurement, and is used to indicate the another resource setting for interference measurement in the measurement configuration.

In this embodiment of this application, the second indication information is carried in the target resource setting for interference measurement, to indicate the plurality of resource settings for interference measurement. This helps reduce a quantity of resource settings for interference measurement that are indicated by the second indication information (that is, the target resource setting for interference measurement does not need to be indicated), and helps reduce overheads caused by indication information transmission.

In an embodiment, the second indication information is an identifier of a resource set that is in the another resource setting for interference measurement and that is used to transmit a CSI-RS.

In an embodiment, the plurality of resource settings for channel measurement include a target resource setting for channel measurement and another resource setting for channel measurement, and the method further includes:
sending, by the network device, third indication information to the terminal device, where the third indication information is used to indicate that there is a correspondence between a resource set in the target resource setting for channel measurement and a resource set in the another resource setting for channel measurement, and the third indication information and the measurement configuration are transmitted separately or together.

That there is a correspondence between a resource set in the target resource setting for channel measurement and a resource set in the another resource setting for channel measurement may be replaced with that there is an association relationship between a resource set in the target resource setting for channel measurement and a resource set in the another resource setting for channel measurement. In other words, a resource set in the target resource setting for channel measurement and a resource set in the another resource setting for channel measurement are associated and configured as resource sets required for joint measurement.

Optionally, the third indication information may be carried in the target resource setting for channel measurement, and is used to indicate the another resource setting for channel measurement in the measurement configuration.

In this embodiment of this application, the third indication information is carried in the target resource setting for channel measurement, to indicate the plurality of resource settings for channel measurement. This helps reduce a quantity of resource settings for channel measurement that are indicated by the third indication information (that is, the target resource setting for channel measurement does not need to be indicated), and helps reduce overheads caused by indication information transmission.

In an embodiment, the third indication information is an identifier of a resource set that is in the another resource setting for channel measurement and that is used to transmit a CSI-RS.

In an embodiment, each of the plurality of resource settings for channel measurement carries indication information used to indicate an RV, and/or each of the plurality of resource settings for interference measurement carries indication information used to indicate an RV.

In this embodiment of this application, each resource setting for channel measurement carries indication information used to indicate an RV, so that a correspondence between the resource setting for channel measurement and the RV is established. In this way, the terminal device learns the RV used to measure a channel state based on each resource setting for channel measurement, thereby simplifying complexity of joint measurement performed by the terminal device.

In this embodiment of this application, each interference measurement resource setting carries indication information used to indicate an RV, so that a correspondence between the interference measurement resource setting and the RV is established. In this way, the terminal device learns the RV used to measure a channel state based on each interference measurement resource setting, thereby simplifying complexity of joint measurement performed by the terminal device.

In an embodiment, the method further includes:
receiving, by the network device, a CSI group and fourth indication information that are sent by the terminal device, where the CSI group includes one or more pieces of CSI, and the fourth indication information is used to indicate a combination of RVs used to generate the one or more pieces of CSI.

In this embodiment of this application, the terminal device may generate the CSI group based on the combination of RVs. In other words, in a process of generating the CSI group, a transmission gain brought by the RVs is considered, thereby improving accuracy of the CSI group.

According to a fourth aspect, a channel measurement configuration method is provided, including:
generating, by a network device, a measurement configuration, where the measurement configuration includes a plurality of resource sets used to transmit a channel state information reference signal CSI-RS; and
sending, by the network device, the measurement configuration to a terminal device.

In this embodiment of this application, a plurality of resource sets are associated in one measurement configuration, so that the terminal device can perform joint measurement based on CSI-RSs received on resources included in the plurality of resource sets. This helps improve accuracy of channel state measurement of the terminal device in a coordinated transmission scenario. This avoids that in the another coordinated transmission scenario, during channel state measurement based on a conventional resource configuration manner, the terminal device can only calculate a channel state for CSI-RSs received on a resource configured in each resource setting for channel measurement and a resource configured in a resource setting for interference measurement that corresponds to the resource setting for channel measurement, which ignores a transmission gain brought when information is transmitted to the terminal device based on coordinated transmission.

For example, in the coordinated transmission scenario, during channel state measurement based on the configuration manner in this embodiment of this application, the terminal device can perform, based on CSI-RSs transmitted on the resources included in the plurality of resource sets by a plurality of network devices participating in coordinated transmission, joint measurement on channel states of the plurality of network devices, and add a joint measurement result to a CSI group. This helps improve accuracy of channel state measurement of the terminal device in the coordinated transmission scenario. This avoids that during channel state measurement based on the conventional resource configuration manner, the terminal device can only separately measure channel quality of the plurality of network devices participating in coordinated transmission, which ignores a transmission gain brought by the plurality of network devices based on the coordinated transmission.

In an embodiment, the measurement configuration includes a second report setting, the second report setting is associated with a resource setting for channel measurement and a resource setting for interference measurement, and the resource setting for channel measurement and the resource setting for interference measurement include the plurality of resource sets.

In this embodiment of this application, one report setting is associated with a plurality of resource sets by using one resource setting for channel measurement and one resource setting for interference measurement, to simplify complexity of an association relationship.

In an embodiment, the resource setting for interference measurement includes a resource set used to transmit a zero-power ZP CSI-RS.

In this embodiment of this application, a resource set used to transmit a zero-power ZP CSI-RS is configured in the resource setting for interference measurement, to reduce a quantity of resources configured in a plurality of resource settings for interference measurement, so that a saved resource is configured for another purpose, thereby improving resource utilization.

In an embodiment, resource sets included in the resource setting for channel measurement include a target resource set and another resource set, and
the method further includes:
sending, by the network device, first indication information to the terminal device, where the first indication information is used to indicate that there is a correspondence between the target resource set and the another resource set, and the first indication information and the measurement configuration are transmitted separately or together.

It should be noted that the "first indication information" is different from the "first indication information" in the first aspect, and is also referred to as "fifth indication information" below for ease of distinguishing.

Optionally, the fifth indication information may be carried in the target resource set, and is used to indicate the another resource set in the measurement configuration.

In this embodiment of this application, the fifth indication information is carried in the target resource set, to indicate the plurality of resource sets. This helps reduce a quantity of resource sets indicated by the fifth indication information (that is, the target resource set does not need to be indicated), and helps reduce overheads caused by indication information transmission.

In an embodiment, each of the plurality of resource sets included in the resource setting for channel measurement carries an RV number.

In this embodiment of this application, each resource set carries indication information used to indicate an RV, so that a correspondence between the resource set and the RV is established. In this way, the terminal device learns the RV used to measure a channel state based on each resource set, thereby simplifying complexity of joint measurement performed by the terminal device.

In an embodiment, the method further includes:
receiving, by the network device, a CSI group and second indication information that are sent by the terminal device, where the CSI group includes one or more pieces of CSI, and the second indication information is used to indicate a combination of RVs used to generate the one or more pieces of CSI.

It should be noted that the "second indication information" is different from the "second indication information" in the first aspect, and is also referred to as "sixth indication information" below for ease of distinguishing.

According to a fifth aspect, a communications apparatus is provided. The communications apparatus has functions for implementing the terminal device in the method design of the first aspect and/or the second aspect. These functions may be implemented by hardware, or may be implemented by hardware by executing corresponding software. The hardware or the software includes one or more units corresponding to the functions.

According to a sixth aspect, a communications apparatus is provided. The communications apparatus has functions for implementing the network device in the method design of the third aspect and/or the fourth aspect. These functions may be implemented by hardware, or may be implemented by hardware by executing corresponding software. The hardware or the software includes one or more units corresponding to the functions.

According to a seventh aspect, a terminal device is provided, including a transceiver, a processor, and a memory. The processor is configured to control the transceiver to receive and send signals, the memory is configured to store a computer program, and the processor is configured to invoke the computer program from the memory and run the computer program, so that the terminal device performs the method in the first aspect and/or the second aspect.

According to an eighth aspect, a network device is provided, including a transceiver, a processor, and a memory. The processor is configured to control the transceiver to receive and send signals, the memory is configured to store a computer program, and the processor is configured to invoke the computer program from the memory and run the computer program, so that the network device performs the method in the third aspect and/or the fourth aspect.

According to a ninth aspect, a computer program product is provided. The computer program product includes computer program code, and when the computer program code runs on a computer, the computer is enabled to perform the methods in the foregoing aspects.

It should be noted that all or a part of the computer program code may be stored in a first storage medium. The first storage medium and the processor may be encapsulated separately or together. This is not specifically limited in this embodiment of this application.

According to a tenth aspect, a computer-readable medium is provided. The computer-readable medium stores program code, and when the computer program code runs on a computer, the computer is enabled to perform the methods in the foregoing aspects.

According to an eleventh aspect, a chip system is provided. The chip system includes a processor, configured for a terminal device to implement functions in the foregoing aspects, for example, generate, receive, send, or process data and/or information in the foregoing methods. In a possible design, the chip system further includes a memory, and the memory is configured to store program instructions and data that are necessary for the terminal device. The chip system may include a chip, or may include a chip and another discrete component. In an embodiment, the chip system may further include a communications interface. The communications interface may be coupled to the processor, and the processor receives and sends data and/or information in the foregoing methods by using the communications interface.

According to a twelfth aspect, a chip system is provided. The chip system includes a processor, configured to support a network device in implementing functions in the foregoing aspects, for example, generate, receive, send, or process data and/or information in the foregoing methods. In a possible design, the chip system further includes a memory, and the memory is configured to store program instructions and data that are necessary for the network device. The chip system may include a chip, or may include a chip and another discrete component. In an embodiment, the chip system may further include a communications interface. The communications interface may be coupled to the processor, and the processor receives and sends data and/or information in the foregoing methods by using the communications interface.

According to a thirteenth aspect, a processor is provided, including an input circuit, an output circuit, and a processing circuit. The processing circuit is configured to receive a signal by using the input circuit, and transmit a signal by using the output circuit, so that the processor performs a function of a terminal device in the foregoing methods.

Optionally, the input circuit may be an input pin, the output circuit may be an output pin, and the processing circuit may be a transistor, a gate circuit, a trigger, various logic circuits, or the like. An input signal received by the input circuit may be, for example but not limited to, received and input by a receiver, a signal output by the output circuit may be, for example but not limited to, output to a transmitter and transmitted by the transmitter, the input circuit and the output circuit may be a same circuit, and the circuit serves as an input circuit and an output circuit respectively at different moments. Specific implementations of the processor and the various circuits are not limited in this embodiment of this application.

According to a fourteenth aspect, a processor is provided, including an input circuit, an output circuit, and a processing circuit. The processing circuit is configured to receive a signal by using the input circuit, and transmit a signal by using the output circuit, so that the processor performs a function of a network device in the foregoing methods.

Optionally, the input circuit may be an input pin, the output circuit may be an output pin, and the processing circuit may be a transistor, a gate circuit, a trigger, various logic circuits, or the like. An input signal received by the input circuit may be, for example but not limited to, received and input by a receiver, a signal output by the output circuit may be, for example but not limited to, output to a transmitter and transmitted by the transmitter, the input circuit and the output circuit may be a same circuit, and the circuit serves as an input circuit and an output circuit respectively at different moments. Specific implementations of the processor and the various circuits are not limited in this embodiment of this application.

DESCRIPTION OF EMBODIMENTS

Figure 1:
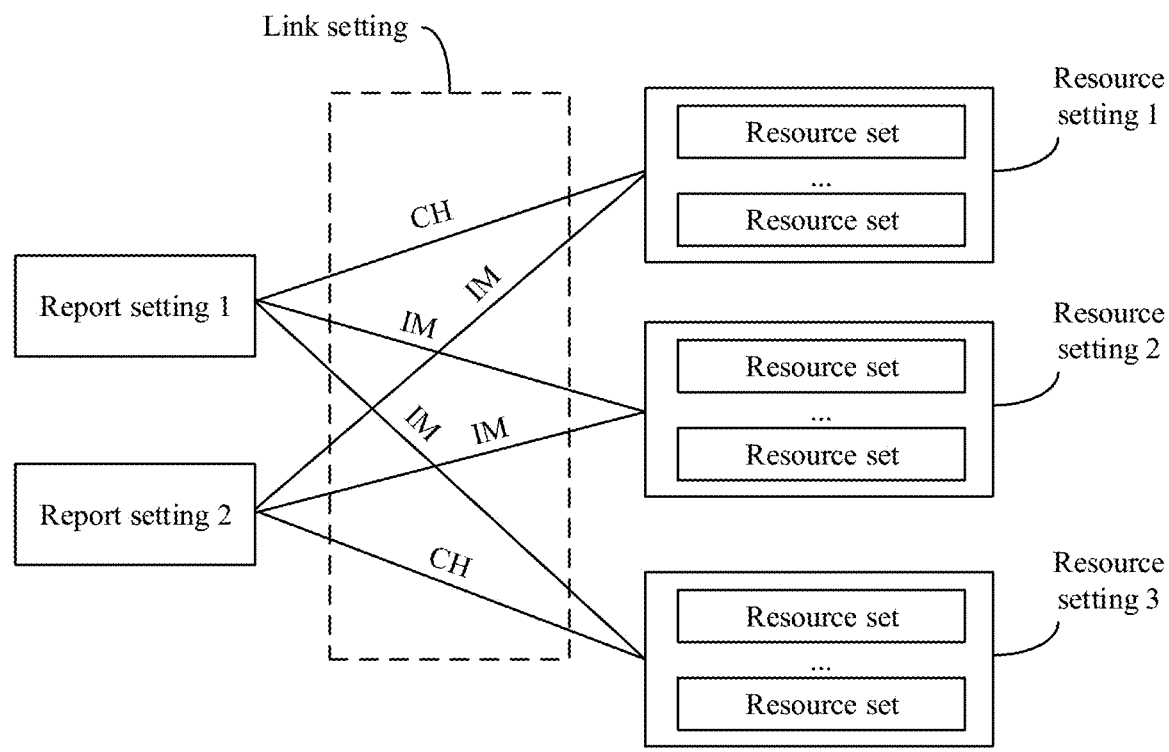
FIG. 1 is a schematic diagram of an association relationship between a report setting, a link setting, and a resource setting.

The following describes technical solutions of this application with reference to the accompanying drawings.

For ease of understanding, terms in embodiments of this application are first described.

1. CSI-RS is a reference signal that can be used for CSI measurement on a downlink channel. In an NR protocol, the CSI-RS may include a non-zero-power (NZP) CSI-RS and a zero-power (ZP) CSI-RS. The NZP CSI-RS may include a CSI-RS used for channel measurement and an NZP CSI-RS used for interference measurement. For a terminal device, the CSI-RS used for channel measurement may be understood as a target signal, and the CSI-RS used for interference measurement may be understood as an interfering signal. The ZP CSI-RS may include a CSI-RS used for interference measurement. Generally, the ZP CSI-RS may be used to measure neighboring cell interference.

In the NZP CSI-RS, the CSI-RS used for channel measurement and the CSI-RS used for interference measurement are described relative to the terminal device. If a network device indicates to the terminal device that a resource is a CSI-RS resource used for channel measurement, a CSI-RS received by the terminal device on the resource is a CSI-RS used for channel measurement. If the network device indicates to the terminal device that another resource is a CSI-RS resource used for interference measurement, a CSI-RS received by the terminal device on the resource is a CSI-RS used for interference measurement. In other words, the CSI-RS is based on the terminal device, or is described as UE-specific. For a same CSI-RS, for one terminal device, the CSI-RS may be a CSI-RS used for channel measurement; for another terminal device, the CSI-RS may be a CSI-RS used for interference measurement.

It should be understood that the CSI-RS is a reference signal used for CSI measurement on a downlink channel, but this should not constitute any limitation on this application. This application does not exclude a possibility that another reference signal is defined in a future protocol or another reference signal in the prior art is reused to implement a same or similar function as the CSI-RS. For example, a DMRS is used for CSI measurement.

2. CSI is used to describe a channel environment. Generally, the CSI includes, but is not limited to, the following parameters: a precoding matrix indicator (precoding matrix indicator, PMI), a rank indicator (RI), a channel quality indicator (CQI), and a layer indicator (LI).

The CQI may be understood as being obtained by quantizing a SINR. The SINR may be obtained based on interference measurement and channel measurement. For a specific calculation manner of the SINR, refer to related descriptions about a channel state measurement result.

3. Report setting (report setting), also referred to as CSI report configuration (CSI-ReportConfig), is used to indicate a parameter carried in CSI that a terminal device needs to report, for example, an LI, a CRI, and a synchronization signal/physical broadcast channel block resource indicator (SS/PBCH block Resource Indicator, SSBRI).

4. Resource setting and resource set are described below.

The resource setting is used to configure a resource used by a terminal device to receive a CSI-RS, and is also referred to as a "CSI-RS resource setting". Generally, the resource setting may include a resource setting for channel measurement (CMR setting) and a resource setting for interference measurement (IMR setting).

The CMR setting is used to configure, for the terminal device, a resource for transmitting a CSI-RS used for channel measurement. The IMR setting is used to configure, for the terminal device, a resource for transmitting a CSI-RS used for interference measurement. The resource for transmitting a CSI-RS used for interference measurement includes: a resource used to transmit an NZP CSI-RS used for interference measurement, also referred to as an NZP-CSI-RS resource for interference; and a resource used to transmit a ZP CSI-RS used for interference measurement, also referred to as a ZP-CSI-RS resource for interference.

For ease of description, in the following description, a resource setting for interference measurement that is used to configure a ZP-CSI-RS resource for interference is referred to as a "first resource setting for interference measurement", and a resource setting for interference measurement that is used to configure an NZP-CSI-RS resource for interference is referred to as a "second resource setting for interference measurement".

It should be noted that, as specified in a current communications protocol, the NZP-CSI-RS resource for interference is applied to an aperiodic CSI reporting process. This is not specifically limited in the embodiments of this application. In a future communications protocol, the NZP-CSI-RS resource for interference may also be applied to a periodic CSI reporting process.

As specified in a current communications protocol, there is a quasi-co-location type D (QCL-Type D) relationship between a resource configured in a resource setting for channel measurement and a resource configured in a resource setting for interference measurement, which are used for a same piece of CSI. In other words, there is a QCL-Type D relationship between a resource setting for channel measurement and a resource setting for interference measurement that corresponds to the resource setting for channel measurement, which are associated with a same report setting.

In the embodiments of this application, when a resource setting for joint measurement includes a plurality of resource settings for channel measurement and a plurality of resource settings for interference measurement, there is a correspondence between the plurality of resource settings for channel measurement and the plurality of resource settings for interference measurement. Specifically, the plurality of resource settings for channel measurement are in a one-to-one correspondence with the plurality of second resource settings for interference measurement, and there is a QCL-Type D relationship between a resource setting for channel measurement and a resource setting for interference measurement that are in a correspondence.

It should be noted that, it may be specified in a protocol that one resource setting for channel measurement corresponds to one resource setting for interference measurement. It may be specified in a report setting that a specific resource setting for channel measurement corresponds to a specific resource setting for interference measurement. For example, it may be carried in the report setting that a resource setting for channel measurement that has an ID of 1 corresponds to a second resource setting for interference measurement that has an ID of 2, and corresponds to a first resource setting for interference measurement that has an ID of 3.

Each resource setting may include S (S≥1, and S is an integer) resource sets. Each resource set may include one or more resources used to transmit a CSI-RS. Therefore, the resource set may also be referred to as a CSI-RS resource set. It should be noted that a resource actually used by a network device to transmit a CSI-RS may be some resources or all resources in a resource set configured in the resource setting.

In the embodiments of this application, a plurality of resource sets for joint measurement include a plurality of resource sets used for channel measurement (also referred to as "channel measurement resource sets") and a plurality of resource sets used for interference detection (also referred to as "channel measurement resource sets"). The plurality of channel measurement resource sets may be in a one-to-one correspondence with the plurality of interference measurement resource sets, and there is a QCL-Type D relationship between a resource included in a channel measurement resource set and a resource included in an interference measurement resource set, which are in a correspondence.

The correspondence between the plurality of channel measurement resource sets and the plurality of interference measurement resource sets may be determined by using resource set identifiers. Optionally, the correspondence may be implemented in ascending order of the resource set identifiers, that is, a resource set with a smallest resource set identifier in the plurality of channel measurement resource sets corresponds to a resource set with a smallest resource set identifier in a plurality of interference measurement resource sets. For example, if the smallest resource set identifier in the plurality of channel measurement resource sets is 2, and the smallest resource set identifier in the plurality of interference measurement resource sets is 4, a resource set whose resource set identifier is 2 corresponds to a resource set whose resource set identifier is 4.

Optionally, a correspondence may be established based on resource set identifiers, and a correspondence between the plurality of channel measurement resource sets and the plurality of interference measurement resource sets is determined by using the correspondence. For example, the correspondence indicates that a resource set whose resource set identifier is 1 in the plurality of channel measurement resource sets corresponds to a resource set whose resource set identifier is 2 in the plurality of interference measurement resource sets.

Optionally, in the correspondence between the plurality of channel measurement resource sets and the plurality of interference measurement resource sets, the plurality of interference measurement resource sets may include only resources used to transmit an NZP CSI-RS.

5. Link setting (link configuration) is used to indicate an association relationship between a resource setting and a report setting, and indicate whether the resource setting associated with the report setting is a CMR setting or an IMR setting.

For example, FIG. 1 is a schematic diagram of an association relationship between a report setting, a link setting, and a resource setting. In FIG. 1, the link setting is used to indicate that a report setting 1 is associated with a resource setting 1, a resource setting 2, and a resource setting 3, and the link setting is used to indicate that the resource setting 1 associated with the report setting 1 is a resource setting for channel measurement, represented by CH; and the resource setting 2 and the resource setting 3 that are associated with the report setting 1 are resource settings for interference measurement, represented by IM. Correspondingly, the link setting is used to indicate that a report setting 2 is associated with the resource setting 1, the resource setting 2, and the resource setting 3, and the link setting is used to indicate that the resource setting 3 associated with the report setting 2 is a resource setting for channel measurement, represented by CH; and the resource setting 1 and the resource setting 2 that are associated with the report setting 2 are resource settings for interference measurement, represented by IM.

6. Measurement configuration is used to configure a parameter carried in CSI sent by a terminal device and a resource used by the terminal device to receive a CSI-RS. Generally, the measurement configuration includes the report setting, the resource setting, and the link setting.

7. Channel state measurement result is described below.

The channel state measurement result may be reflected by a signal to interference plus noise ratio (SINR).

$$SINR = \frac{S}{(I+N)}, S$$

represents strength of a wanted signal received by a terminal device, in a CSI-RS received by the terminal device, I represents strength of an interfering signal received by the terminal device, and N represents strength of noise received by the terminal device.

The strength of the wanted signal received by the terminal device may be understood as strength of a CSI-RS received by the terminal device on a resource configured in a resource setting for channel measurement, and the strength of the interfering signal and the noise signal received by the terminal device may be understood as strength of a CSI-RS received by the terminal device on a resource configured in a resource setting for interference measurement.

It should be noted that "a plurality of" in the embodiments of this application corresponds to joint measurement. For example, a plurality of resource sets may be understood as performing joint measurement on CSI-RSs transmitted on the plurality of resource sets. For another example, a plurality of resource settings may be understood as performing joint measurement on CSI-RSs transmitted on resource sets configured in the plurality of resource settings. For another example, a plurality of report settings may be understood as performing joint measurement on CSI-RSs transmitted on resource sets configured in resource settings associated with the plurality of report settings.

Figure 2:
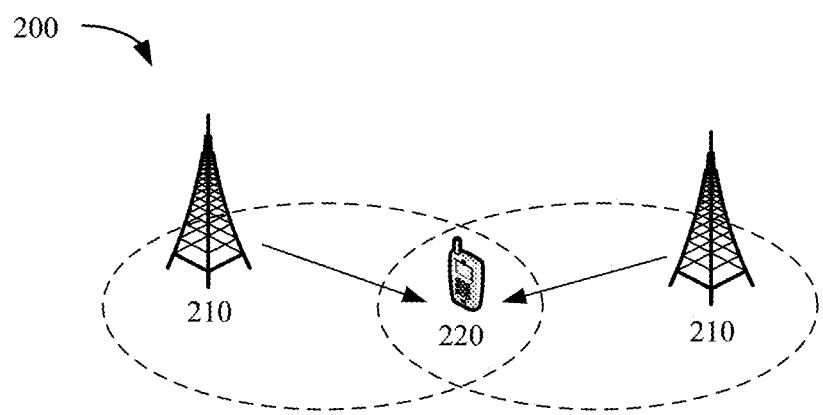
FIG. 2 shows a wireless communications system 200 to which an embodiment of this application is applied.

The following describes, with reference to FIG. 2, a communications system to which an embodiment of this application is applicable. FIG. 2 is a schematic diagram of a communications system 200 to which an embodiment of this application is applicable. For example, FIG. 2 shows a communications system including two network devices 210 and one terminal device 220. It should be noted that the communications system 200 may include a plurality of network devices, and coverage of each network device may include another quantity of terminal devices. This is not limited in this embodiment of this application.

Optionally, the wireless communications system 200 may further include other network entities such as a network controller and a mobility management entity. This is not limited in this embodiment of this application.

The communications system may be a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system, or a new radio (NR) system.

The terminal device is any device having a wireless transceiver function or a chip that may be disposed in the device. The device includes but is not limited to a mobile station (MS), a mobile terminal, a mobile phone (mobile telephone), user equipment (UE), a handset, portable equipment, and the like. The terminal device may communicate with one or more core networks through a radio access network (RAN). For example, the terminal device may be a mobile phone (or referred to as a "cellular" telephone), or a computer having a wireless communication function. Alternatively, the terminal device may be a portable, pocket-sized, handheld, computer built-in, or in-vehicle mobile apparatus. Alternatively, the terminal device may be a terminal device in a future 5G network, a terminal device in a future evolved public land mobile network (PLMN), or the like. This is not limited in this embodiment of this application.

The network device in the communications system may be any device having a radio transceiver function or a chip that may be disposed in the device. The device includes, but is not limited to, an evolved Node B (eNB), a radio network controller (RNC), and a node B (NB), a base station controller (BSC), a base transceiver station (BTS), a home NodeB (for example, a Home evolved NodeB, or a Home Node B, HNB), a baseband unit (BBU), or an access point (AP), a wireless relay node, a wireless backhaul node, a transmission point (TP), or a transmission and reception point (TRP), or the like in a Wireless Fidelity (WIFI) system, or may be a gNB or a transmission point (TRP or TP) in a 5G system, for example, an NR system, an antenna panel or an antenna panel group (including a plurality of antenna panels) of a base station in a 5G system, or may be a network node included in a gNB or a transmission point, for example, a baseband unit (BBU) or a distributed unit (DU). This is not limited in this embodiment of this application.

In this embodiment of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more of computer operating systems that implement service processing by using a process, for example, a Linux operating system, a Unix operating system, an Android operating system, an iOS operating system, or a Windows operating system. The application layer includes applications such as a browser, an address book, word processing software, and instant messaging software. In addition, in this embodiment of this application, a specific structure of an entity for performing a method provided in the embodiments of this application is not particularly limited, provided that the entity can run a program recording code of the method in the embodiments of this application, to perform communication according to the method provided in the embodiments of this application. For example, the method provided in the embodiments of this application may be performed by a terminal device, a network device, or a functional module that is in a terminal device or a network device and that can invoke and execute the program.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (CD) or a digital versatile disc (DVD)), a smart card and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry instructions and/or data.

Currently, in a coordinated transmission scenario (for example, CoMP/FeCoMP), before a plurality of network devices transmit data to a terminal device based on coordinated transmission, the terminal device needs to separately detect channel states of the plurality of network devices. Generally, the terminal device first receives a plurality of measurement configurations respectively sent by the plurality of network devices, then separately measures the channel states of the plurality of network devices based on each of the plurality of measurement configurations, and finally feeds back CSI corresponding to each network device to the plurality of network devices separately. However, in the foregoing mechanism of measuring the channel states by the terminal device, a diversity gain brought when the plurality of network devices perform coordinated transmission for the terminal device is not considered. As a result, transmission parameters selected by the plurality of network devices based on respective received CSI are improper.

To avoid the foregoing problem, an embodiment of this application provides a channel measurement method. In a coordinated transmission scenario, joint measurement is performed on resources corresponding to coordinated transmission, and a CSI group is fed back based on a joint measurement result. Each piece of CSI included in the CSI group is used to indicate the joint measurement result. For example, joint measurement may be performed on CSI-RSs transmitted by a plurality of network devices participating in coordinated transmission, a joint measurement result is generated by comprehensively considering channel measurement results of the plurality of network devices and interference measurement results of the plurality of network devices, and a CSI group is fed back based on the joint measurement result.

In addition, to apply to the joint measurement scenario provided in the foregoing embodiment of this application, an embodiment of this application further provides a channel measurement configuration method, to configure, by using a measurement configuration, a terminal device to perform joint measurement.

The following first describes the channel measurement configuration method in the embodiments of this application with reference to FIG. 3 to FIG. 7, that is, a terminal device is configured by using a measurement configuration to perform joint measurement on a plurality of network devices participating in coordinated transmission. Specifically, there may be three configuration manners, which are separately described below with reference to accompanying drawings.

Figure 3:
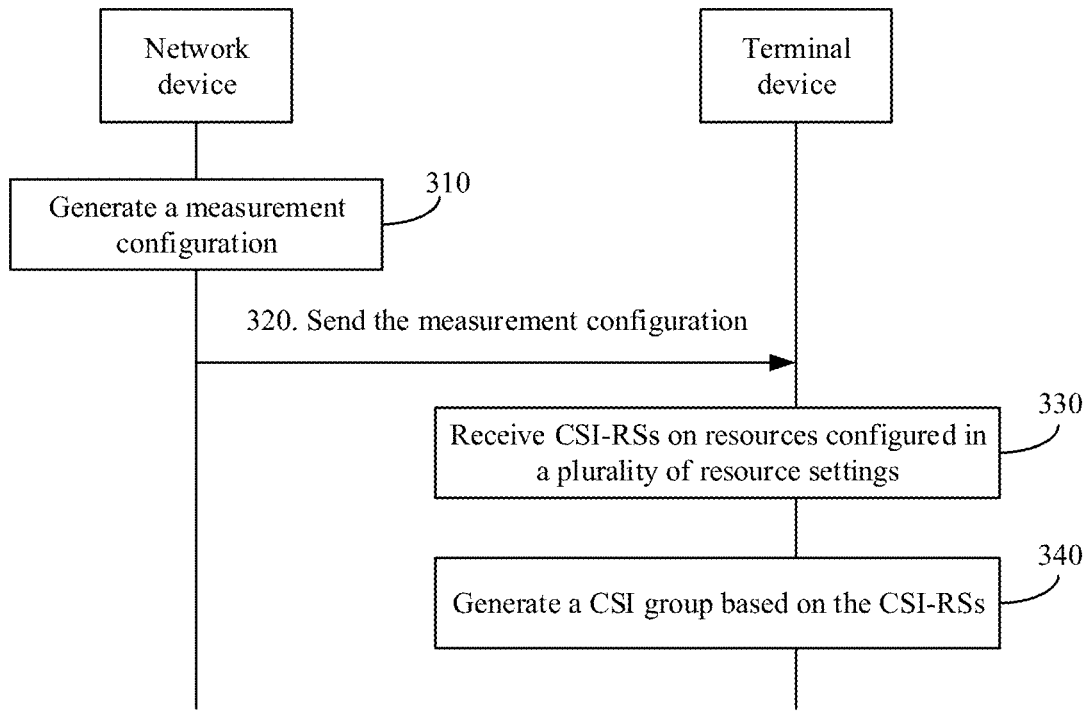
FIG. 3 is a flowchart of a channel measurement configuration method according to an embodiment of this application.

FIG. 3 is a flowchart of a channel measurement configuration method according to an embodiment of this application. The method shown in FIG. 3 includes step 310 to step 340.

310. A network device generates a measurement configuration, where the measurement configuration includes a plurality of resource settings, and the plurality of resource settings include a plurality of resource settings for channel measurement and a plurality of resource settings for interference measurement.

The resource settings for interference measurement may include a plurality of second resource settings for interference measurement, and each of the plurality of resource settings for channel measurement may correspond to one second resource setting for interference measurement. There is a QCL-Type D relationship between a resource configured in a resource setting for channel measurement and a resource configured in a second resource setting for interference measurement that corresponds to the resource setting for channel measurement.

The plurality of resource settings for interference measurement may further include a plurality of first resource settings for interference measurement, or include one first resource setting for interference measurement. If the plurality of resource settings for interference measurement include one first resource setting for interference measurement, the plurality of resource settings for channel measurement may correspond to one first resource setting for interference measurement.

When the plurality of resource settings for interference measurement include a plurality of first resource settings for interference measurement, the plurality of first resource settings for interference measurement may be different or the same. If the plurality of first resource settings for interference measurement are the same, it indicates that resources configured in the plurality of first resource settings for interference measurement to transmit a ZP CSI-RS are the same.

Correspondingly, a terminal device may perform joint measurement based on CSI-RSs received on resources configured in the plurality of resource settings. Therefore, the plurality of resource settings may be referred to as "joint measurement resource settings", and the resources configured in the plurality of resource settings may be referred to as "joint measurement resources".

Optionally, different resource settings for channel measurement in the plurality of resource settings for channel measurement correspond to different network devices in the plurality of network devices participating in coordinated transmission, and the plurality of resource settings for channel measurement are used to configure resources used to perform joint channel measurement on the plurality of network devices.

The plurality of resource settings for channel measurement and the plurality of resource settings for interference measurement may be associated with a plurality of report settings, or the plurality of resource settings for channel measurement and the plurality of resource settings for interference measurement may be associated with one report setting. The following separately describes the foregoing two configuration manners with reference to accompanying drawings.

Configuration manner 1: The plurality of resource settings for channel measurement and the plurality of resource settings for interference measurement are associated with a plurality of report settings.

The plurality of resource settings for channel measurement and the plurality of resource settings for interference measurement are in a one-to-one correspondence, and a resource setting for channel measurement and a resource setting for interference measurement that are in a correspondence are associated with one report setting.

The plurality of report settings may be a plurality of report settings required for the terminal device to perform joint measurement. In other words, the terminal device performs joint measurement based on resource settings associated with the plurality of report settings.

Optionally, different report settings in the plurality of report settings correspond to different network devices in the plurality of network devices. A resource setting (including a resource setting for channel measurement and a resource setting for interference measurement) associated with each report setting may correspond to one network device. A resource setting for channel measurement and a resource setting for interference measurement that are used to detect a channel state of a same network device corresponds to each other, and there is a QCL-Type D relationship between a resource configured in the resource setting for channel measurement and a resource configured in the resource setting for interference measurement.

It should be noted that, some resource settings in the plurality of resource settings for channel measurement may overlap with those in the plurality of resource settings for interference measurement. In other words, a resource setting may have different functions when associated with different report settings. For example, when the resource setting 1 shown in FIG. 1 is associated with the report setting 1, the resource setting 1 may be used as a resource setting for channel measurement, and when the resource setting 1 is associated with the report setting 2, the resource setting 1 may be used as a resource setting for interference measurement.

Figure 4:
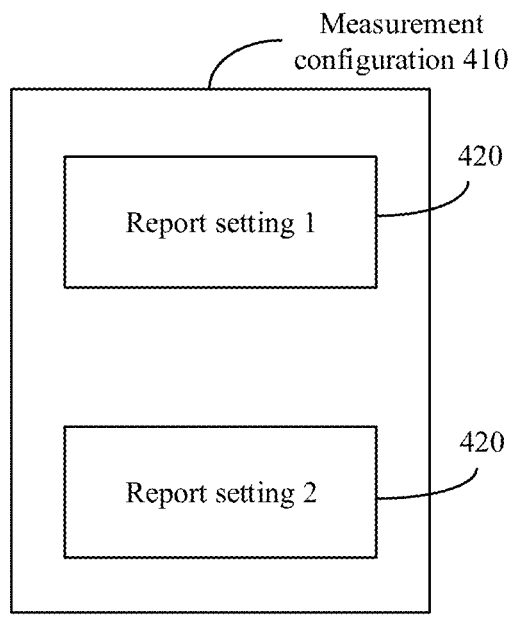
FIG. 4 is a schematic diagram of a measurement configuration according to an embodiment of this application.

FIG. 4 is a schematic diagram of a measurement configuration according to an embodiment of this application. The measurement configuration shown in FIG. 4 is described by using an example in which joint measurement resources are configured for two network devices. The measurement configuration 410 includes two report settings 420: a report setting 1 and a report setting 2. The terminal device performs joint measurement based on the two report settings. For an association relationship between each report setting and a resource setting, refer to a specification in an existing communications protocol. In addition, as specified in the existing communications protocol, the measurement configuration may further include another setting. This is not limited in this embodiment of this application.

Configuration manner 2: The plurality of resource settings for channel measurement and the plurality of resource settings for interference measurement are associated with one report setting.

Optionally, different resource settings for channel measurement in the plurality of resource settings for channel measurement may correspond to different network devices in the plurality of network devices participating in coordinated transmission, or different antenna panels in a plurality of antenna panels participating in coordinated transmission. Different resource settings for interference measurement in the plurality of resource settings for interference measurement may correspond to different network devices in the plurality of network devices participating in coordinated transmission, or different antenna panels in the plurality of antenna panels participating in coordinated transmission.

Optionally, the plurality of resource settings for channel measurement and the plurality of resource settings for interference measurement are in a one-to-one correspondence, and a resource setting for channel measurement and a resource setting for interference measurement that are in a correspondence are used to measure a channel state of a same network device. Correspondingly, the correspondence between the plurality of resource settings for channel measurement and the plurality of resource settings for interference measurement may be carried in the report setting. Certainly, the correspondence may alternatively be carried in the measurement configuration, or may be indicated by the network device to the terminal device by using dedicated information. This is not limited in this application.

It should be noted that, some resource settings in the plurality of resource settings for channel measurement may overlap with those in the plurality of resource settings for interference measurement. In other words, a resource setting may have different functions when channel states of different network devices are measured. For example, the resource setting 1 may be used as a resource setting for channel measurement when a channel state of a network device 1 is measured, and the resource setting 1 may be used as a resource setting for interference measurement when a channel state of a network device 2 is measured.

Figure 5:
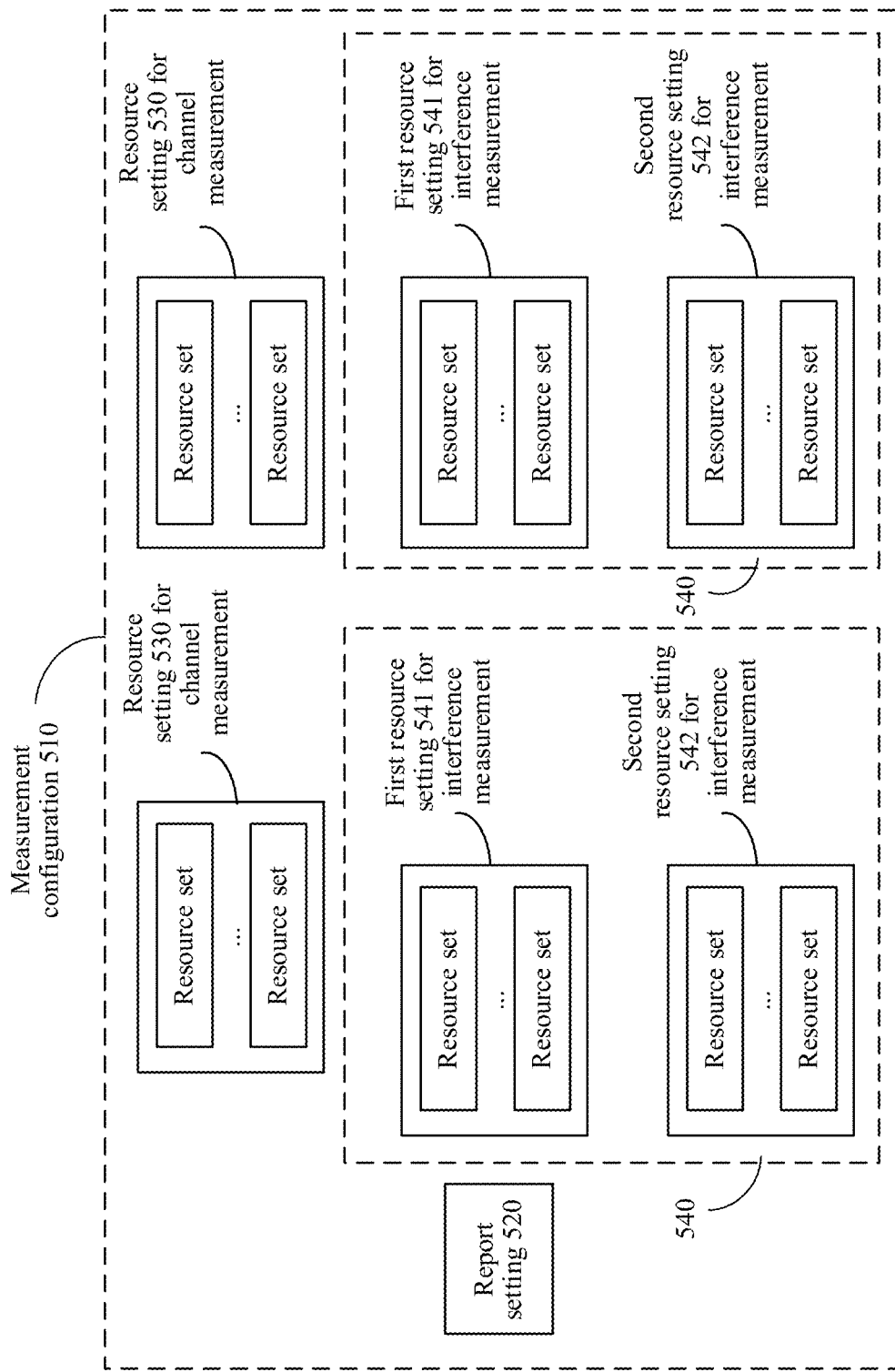
FIG. 5 is a schematic diagram of a measurement configuration according to an embodiment of this application.

FIG. 5 is a schematic diagram of a measurement configuration according to an embodiment of this application. The measurement configuration shown in FIG. 5 shows only an example of a manner of configuring joint measurement resources for two network devices. The measurement configuration 510 includes a report setting 520. The report setting is associated with two resource settings 530 for channel measurement and two resource settings 540 for interference measurement. The resource setting for interference measurement includes a first resource setting 541 for interference measurement that is used to configure a resource used to transmit a ZP CSI-RS, and a second resource setting 542 for interference measurement that is used to configure a resource used to transmit an NZP CSI-RS.

Optionally, the two resource settings for channel measurement respectively correspond to the two network devices participating in coordinated transmission, and the two resource settings for interference measurement respectively correspond to the two network devices participating in coordinated transmission. For a resource set included in each resource setting (including the resource settings for channel measurement and the resource settings for interference measurement), refer to a specification in an existing communications protocol. In addition, as specified in the existing communications protocol, the measurement configuration may further include another setting. This is not limited in this embodiment of this application.

320. The terminal device receives the measurement configuration sent by the network device.

The measurement configuration may be transmitted in a transmission manner specified in an existing protocol, for example, may be carried in radio resource control (RRC) signaling for transmission. Alternatively, the measurement configuration may be separately transmitted. This is not limited in this embodiment of this application.

330. The terminal device receives CSI-RSs on resources configured in the plurality of resource settings.

340. The terminal device generates a CSI group based on the CSI-RSs, where the CSI group includes one or more pieces of CSI.

The CSI in the CSI group is used to indicate a measurement result of joint measurement performed by the terminal device based on the CSI-RSs. A specific manner in which the terminal device generates the joint measurement is described below with reference to FIG. 8.

In this embodiment of this application, a plurality of resource settings for channel measurement and a plurality of resource settings for interference measurement are associated in one report setting, so that the terminal device can perform joint measurement based on CSI-RSs received on resources configured in the plurality of resource settings for channel measurement and the plurality of resource settings for interference measurement. This helps improve accuracy of channel state measurement of the terminal device in a coordinated transmission scenario. This avoids that in the coordinated transmission scenario, during channel state measurement based on a conventional resource configuration manner, the terminal device can only calculate a channel state for CSI-RSs received on a resource configured in each resource setting for channel measurement and a resource configured in a resource setting for interference measurement that corresponds to the resource setting for channel measurement, which ignores a transmission gain brought when information is transmitted to the terminal device based on coordinated transmission.

For example, in the coordinated transmission scenario, during channel state measurement based on the configuration manner in this embodiment of this application, the terminal device can perform, based on the CSI-RSs transmitted on the resources configured in the plurality of resource settings, joint measurement on channel states of a plurality of network devices participating in coordinated transmission, and add a joint measurement result to the CSI group. This helps improve accuracy of channel state measurement of the terminal device in the coordinated transmission scenario. This avoids that during channel state measurement based on the conventional resource configuration manner, the terminal device can only separately measure channel quality of the plurality of network devices participating in coordinated transmission, which ignores a transmission gain brought by the plurality of network devices based on the coordinated transmission.

Figure 6:
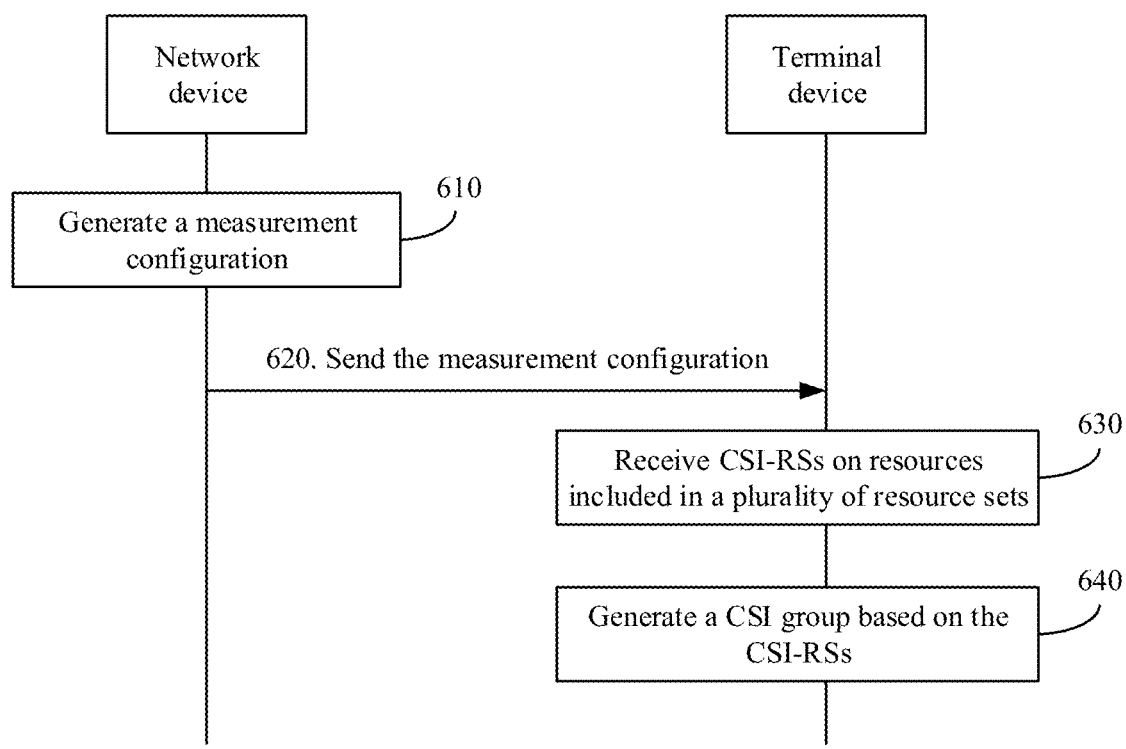
FIG. 6 is a flowchart of a channel measurement configuration method according to another embodiment of this application.
Figure 7:
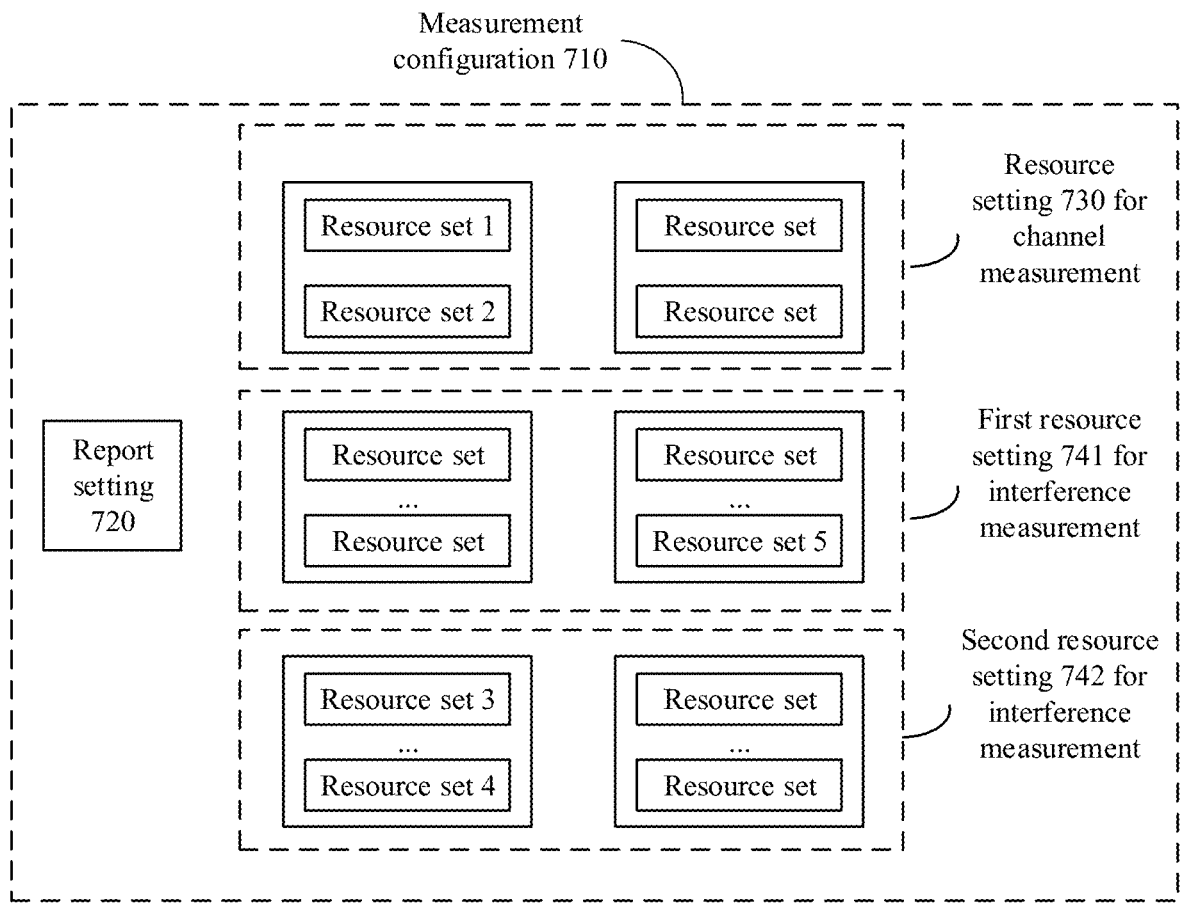
FIG. 7 is a schematic diagram of a measurement configuration according to an embodiment of this application.

The following describes, with reference to FIG. 6 and FIG. 7, a configuration manner 3 provided in an embodiment of this application. FIG. 6 is a flowchart of a channel measurement configuration method according to another embodiment of this application. The method shown in FIG. 6 includes step 610 to step 630.

610. A network device generates a measurement configuration, where the measurement configuration includes a plurality of resource sets used to transmit a CSI-RS.

In the configuration manner 3, the plurality of resource sets in the measurement configuration may include: a plurality of resource sets for transmitting a CSI-RS used for channel measurement, which are referred to as "channel measurement resource sets" for short; and a plurality of resource sets for transmitting a CSI-RS used for interference measurement, which are referred to as "interference measurement resource sets" for short. Resources included in the plurality of channel measurement resource sets and resources included in the plurality of interference measurement resource sets are resources used by a terminal device to perform joint measurement. In other words, joint measurement on all resource sets in a channel measurement setting is used as channel measurement information, and joint measurement on all resource sets in an interference measurement setting is used as interference measurement information. Therefore, the resource set may also be referred to as a joint measurement resource set. A resource included in each resource set may be referred to as a joint measurement resource.

The plurality of channel measurement resource sets may be configured by using one resource setting for channel measurement, the plurality of interference measurement resource sets may be configured by using one resource setting for interference measurement, and the resource setting for channel measurement and the resource setting for interference measurement may be associated with one report setting (also referred to as a "second report setting").

The plurality of interference measurement resource sets may include a plurality of first interference measurement resource sets and a plurality of second interference measurement resource sets. A resource in the first interference measurement resource set is used to transmit a ZP CSI-RS, and a resource in the second interference measurement resource set is used to transmit an NZP CSI-RS. The plurality of first interference measurement resource sets may be a same resource set, or may be different resource sets. The plurality of interference measurement resource sets may further include one first resource set and a plurality of second resource sets.

The plurality of channel measurement resource sets are in a one-to-one correspondence with the plurality of second interference measurement resource sets, and there is a QCL-Type D relationship between a resource in each of the plurality of channel measurement resource sets and a resource in an interference measurement resource set corresponding to the channel measurement resource set.

Optionally, resources included in the plurality of resource sets included in the measurement configuration may be resources used to transmit CSI-RSs by the plurality of network devices participating in coordinated transmission, and the terminal device may perform joint measurement on channel states of the plurality of network devices based on CSI-RSs received on the resources. In the plurality of channel measurement resource sets and the plurality of second interference measurement resource sets, there is a QCL-Type D relationship between a resource in a channel measurement resource set and a resource in an interference measurement resource set, which are used to measure channel state information of a same network device.

FIG. 7 is a schematic diagram of a measurement configuration according to an embodiment of this application. The measurement configuration shown in FIG. 7 is described by using an example in which joint measurement resources are configured for two network devices. The measurement configuration 710 includes a report setting 720. The report setting is associated with a resource setting 730 for channel measurement and a resource setting for interference measurement (including a first resource setting 741 for interference measurement and a second resource setting 742 for interference measurement). Resource sets configured in the resource setting for channel measurement and resource sets configured in the resource setting for interference measurement are joint measurement resource sets.

Optionally, the resource setting for channel measurement includes two channel measurement resource sets, and the two channel measurement resource sets respectively include resources used by the two network devices to send CSI-RSs used for channel measurement. The resource setting for interference measurement includes the first resource setting 741 for interference measurement and the second resource setting 742 for interference measurement. The first resource setting for interference measurement is used to configure two resource sets used to transmit a ZP CSI-RS. The second resource setting for interference measurement is used to configure two resource sets used to transmit an NZP CSI-RS.

It should be noted that, as specified in an existing communications protocol, the measurement configuration may further include another setting. This is not limited in this embodiment of this application.

620. The network device sends the measurement configuration to the terminal device.

The measurement configuration may be transmitted in a transmission manner specified in an existing protocol, for example, may be carried in RRC signaling for transmission. Alternatively, the measurement configuration may be separately transmitted. This is not limited in this embodiment of this application.

630. The terminal device receives CSI-RSs on resources included in the plurality of resource sets.

640. The terminal device generates a CSI group based on the CSI-RSs, where the CSI group includes one or more pieces of CSI.

The CSI in the CSI group is used to indicate a measurement result of joint measurement performed by the terminal device based on the CSI-RSs. A specific manner in which the terminal device generates the joint measurement is described below with reference to FIG. 8.

In this embodiment of this application, a plurality of resource sets are associated in one measurement configuration, so that the terminal device can perform joint measurement based on CSI-RSs received on resources included in the plurality of resource sets. This helps improve accuracy of channel state measurement of the terminal device in a coordinated transmission scenario. This avoids that in the coordinated transmission scenario, during channel state measurement based on a conventional resource configuration manner, the terminal device can only calculate a channel state for CSI-RSs received on a resource configured in each resource setting for channel measurement and a resource configured in a resource setting for interference measurement that corresponds to the resource setting for channel measurement, which ignores a transmission gain brought when information is transmitted to the terminal device based on coordinated transmission.

For example, in the coordinated transmission scenario, during channel state measurement based on the configuration manner in this embodiment of this application, the terminal device can perform, based on CSI-RSs transmitted on the resources included in the plurality of resource sets by a plurality of network devices participating in coordinated transmission, joint measurement on channel states of the plurality of network devices, and add a joint measurement result to the CSI group. This helps improve accuracy of channel state measurement of the terminal device in the coordinated transmission scenario. This avoids that during channel state measurement based on the conventional resource configuration manner, the terminal device can only separately measure channel quality of the plurality of network devices participating in coordinated transmission, which ignores a transmission gain brought by the plurality of network devices based on the coordinated transmission.

The foregoing describes, with reference to FIG. 1 to FIG. 7, three configuration manners for configuring resources for joint measurement. The terminal device may directly determine by default that resources configured in the three configuration manners are resources required for joint measurement. In other words, indication information is implicit. Alternatively, the terminal device may determine, based on indication information, that resources configured in the three configuration manners are resources required for joint measurement. In other words, the indication information is explicit. When the indication information is explicit, there are many implementations of the indication information. The following separately describes four possible indication manners.

Before the determining, by using the indication information, resources for joint measurement is described, the determining, by the terminal device in a direct default manner, resources for joint measurement is described with reference to the three configuration manners.

In the configuration manner 1, when joint measurement is indicated implicitly, if the terminal device learns, after receiving the measurement configuration, that the measurement configuration includes a plurality of report settings within a preset time interval, and reporting types of the plurality of report settings are the same, for example, all are report settings used to configure periodic CSI reporting, or all are report settings used to configure semi-persistent CSI reporting, or all are report settings used to configure aperiodic CSI reporting, the terminal device may determine, by default according to a preset rule, that resources configured in a plurality of resource settings associated with the plurality of report settings are joint measurement resources, that is, the terminal device needs to perform joint measurement on CSI-RSs received on the resources configured in the plurality of resource settings.

The preset time interval may be indicated by the network device to the terminal device, or may be specified based on a communications protocol. This is not specifically limited in this application.

For example, in FIG. 4, the terminal device learns, within a preset time interval, that the measurement configuration includes two report settings of a same type, that is, both are report settings used to configure periodic CSI reporting. Then, the terminal device may determine by default that resources configured in resource settings associated with the two report settings are joint measurement resources.

In the configuration manner 2, when joint measurement is indicated implicitly, the terminal device may determine, by using an association relationship between a report setting and a resource setting, resource settings required for joint measurement. Specifically, there may be the following two manners.

Determining manner 1: The terminal device determines all resource settings based on a report setting.

After receiving a report setting, the terminal device learns a plurality of resource settings for channel measurement and a plurality of interference measurement settings that are associated with the report setting. Then, the terminal device may determine by default to perform joint measurement based on CSI-RSs transmitted on resources configured in the plurality of resource settings for channel measurement and resources configured in the plurality of interference measurement settings. Resources configured in the plurality of resource settings for channel measurement and the plurality of resource settings for interference measurement are joint measurement resources.

For example, in FIG. 5, after receiving a report setting 520, the terminal device may determine, based on an association relationship, that the report setting 520 is associated with two resource settings 530 for channel measurement and two resource settings 540 for interference measurement. Therefore, the terminal device may determine by default that resources configured in the two resource settings 530 for channel measurement and the two resource settings 540 for interference measurement are joint measurement resources.

Determining manner 2: The terminal device determines, based on a report setting, a resource setting for channel measurement or a resource setting for interference measurement.

After receiving a report setting, the terminal device learns a plurality of resource settings for channel measurement that are associated with the report setting. Then, the terminal device may determine by default to perform joint measurement based on CSI-RSs transmitted on resources configured in the plurality of resource settings for channel measurement and resources configured in interference measurement settings corresponding to the plurality of resource settings for channel measurement.

Alternatively, after receiving a report setting, the terminal device learns a plurality of resource settings for interference measurement that are associated with the report setting. Then, the terminal device may determine by default to perform joint measurement based on CSI-RSs transmitted on resources configured in the plurality of resource settings for interference measurement and resources configured in resource settings for channel measurement that correspond to the plurality of resource settings for interference measurement. Resources configured in the plurality of resource settings for channel measurement and the plurality of resource settings for interference measurement are joint measurement resources.

For example, in FIG. 5, after receiving a report setting 520, the terminal device may determine, based on an association relationship, that the report setting 520 is associated with two resource settings 530 for channel measurement. The terminal device may further determine, based on a correspondence between a resource setting for channel measurement and a resource setting for interference measurement, two resource settings 540 for interference measurement that correspond to the two resource settings 530 for channel measurement. Therefore, the terminal device may determine by default that resources configured in the two resource settings 530 for channel measurement and the two resource settings 540 for interference measurement are joint measurement resources.

For another example, in FIG. 5, after receiving a report setting 520, the terminal device may determine, based on an association relationship, that the report setting 520 is associated with two resource settings 540 for interference measurement. The terminal device may further determine, based on a correspondence between a resource setting for channel measurement and a resource setting for interference measurement, two resource settings 530 for channel measurement that correspond to the two resource settings 540 for interference measurement. Therefore, the terminal device may determine by default that resources configured in the two resource settings 530 for channel measurement and the two resource settings 540 for interference measurement are joint measurement resources.

In the configuration manner 3, when joint measurement is indicated implicitly, if the terminal device learns at least one of the following configuration forms after receiving the measurement configuration: a channel measurement setting includes a plurality of resource sets, a second interference measurement setting includes a plurality of second resource sets, and a first interference measurement setting includes a plurality of first resource sets, the terminal device may directly determine by default that resources in the plurality of resource sets configured in the channel measurement setting, the second interference measurement setting, and the first interference measurement setting are joint measurement resources, that is, the terminal device needs to perform joint measurement on CSI-RSs received on resources in the plurality of resource sets.

Optionally, after the terminal device determines that any one of the three resource settings includes a plurality of resource sets, the terminal device may determine joint measurement resources based on the resource setting including the plurality of resource sets and an association relationship between different types of resource settings and a report setting or a correspondence between different types of resource settings.

For example, in FIG. 7, after the terminal device receives a measurement configuration 710, the terminal device determines that a resource setting 730 for channel measurement that is associated with a report setting 720 includes a plurality of resource sets. Then, the terminal device determines, based on a correspondence between a resource setting for channel measurement and a resource setting for interference measurement, a resource setting for interference measurement (including a first resource setting 741 for interference measurement and a second resource setting 742 for interference measurement) corresponding to the resource setting 730 for channel measurement.

For another example, in FIG. 7, after the terminal device receives a measurement configuration 710, the terminal device determines that a first resource setting 741 for interference measurement that is associated with a report setting 720 includes a plurality of resource sets. Then, the terminal device determines, based on a correspondence between a resource setting for channel measurement and a resource setting for interference measurement, a resource setting for channel measurement that corresponds to the first resource setting 730 for interference measurement.

For another example, in FIG. 7, after the terminal device receives a measurement configuration 710, the terminal device determines that a second resource setting 742 for interference measurement that is associated with a report setting 720 includes a plurality of resource sets. Then, the terminal device determines, based on the report setting 720 associated with the second resource setting 742 for interference measurement and an association relationship between a report setting and a resource setting, a resource setting 730 for channel measurement and a first resource setting 741 for interference measurement that are associated with the report setting 720.

The following describes, with reference to the three configuration manners described above, a method for determining joint measurement resources after the terminal device receives indication information (in other words, the indication information is explicit). To distinguish between indication information in different indication manners, in the following description, indication information 1 is used to represent indication information in an indication manner 1, indication information 2 is used to represent indication information in an indication manner 2, indication information 3 is used to represent indication information in an indication manner 3, and indication information 4 is used to represent indication information in an indication manner 4.

Indication manner 1: The indication information 1 is used to indicate a plurality of report settings corresponding to joint measurement.

The indication manner 1 may be used in combination with the configuration manner 1. To be specific, after receiving a measurement configuration in the configuration manner 1, the terminal device may determine, based on the indication information 1, that there is a correspondence between the plurality of report settings. Further, the terminal device may determine, based on an association relationship between a report setting and a resource setting (including a resource setting for channel measurement and a resource setting for interference measurement), a plurality of resource settings corresponding to joint measurement. Specifically, the terminal device determines, by using a link setting, a resource setting associated with each of the plurality of report settings, that is, resources included in resource settings associated with the plurality of report settings are joint measurement resources.

The indication information 1 may directly indicate that there is a correspondence between the plurality of report settings, that is, resource settings associated with the plurality of report settings are resource settings used for joint measurement. For example, the indication information 1 may be identifiers of the plurality of report settings. Correspondingly, the indication information 1 may be sent together with the measurement configuration, or in other words, the indication information 1 is carried in the measurement configuration. Alternatively, the indication information 1 may be sent separately. This is not limited in this embodiment of this application.

For example, in FIG. 4, the indication information 1 may be carried in the measurement configuration 410. After receiving the measurement configuration, the terminal device determines, based on the indication information 1, that there is a correspondence between the report setting 1 and the report setting 2, which are report settings required for joint measurement.

The plurality of report settings may include a target report setting and another report setting other than the target report setting. The indication information 1 may indicate that there is a correspondence between the target report setting and the another report setting. The target report setting is any one of the plurality of report settings. For example, the indication information 1 may be an identifier of the another report setting. In this case, the indication information 1 may be carried in the target report setting. After receiving the indication information 1, the terminal device determines that there is a correspondence between the target report setting carrying the indication information 1 and the another report setting indicated by the indication information 1.

For example, in FIG. 4, the indication information 1 is carried in the report setting 1, and the indication information 1 is used to indicate the report setting 2. After receiving the indication information 1, the terminal device determines, based on the indication information 1, that there is a correspondence between the report setting 1 and the report setting 2, which are report settings required for joint measurement.

Indication manner 2: The indication information 2 is used to indicate a plurality of resource settings for channel measurement that correspond to joint measurement.

Optionally, the indication information 2 may directly indicate the resource settings for channel measurement, or may indicate resource sets for transmitting a CSI-RS that are configured in the resource settings for channel measurement.

(1) The indication information 2 may indicate the plurality of resource settings for channel measurement that are required for joint measurement. For example, the indication information 2 may be identifiers of the plurality of resource settings for channel measurement. Alternatively, the indication information 2 may indicate another resource setting for channel measurement other than a target resource setting for channel measurement in the plurality of resource settings for channel measurement. For example, the indication information 2 may be an identifier of the another resource setting for channel measurement.

The indication information 2 may be carried in the target resource setting for channel measurement, or may be carried in a measurement configuration, or may be transmitted by using separate signaling. This is not specifically limited in this embodiment of this application.

Correspondingly, after receiving the indication information 2, the terminal device may determine, based on the indication information 2, the plurality of resource settings for channel measurement. Further, the terminal device may determine, based on a correspondence between a resource setting for channel measurement and a resource setting for interference measurement, a plurality of resource settings for interference measurement that correspond to joint measurement.

It should be noted that the resource setting for interference measurement includes a first resource setting for interference measurement and a second resource setting for interference measurement. Alternatively, the resource setting for interference measurement is a second resource setting for interference measurement.

If the resource setting for interference measurement is the second resource setting for interference measurement, and the correspondence between the resource setting for channel measurement and the resource setting for interference measurement is a correspondence between the resource setting for channel measurement and the second resource setting for interference measurement, the terminal device may determine, by using other indication information, a first resource setting for interference measurement that is used for joint measurement. The other indication information is used to indicate the first resource setting for interference measurement.

The indication information 2 and the other indication information may be transmitted together or separately. This is not limited in this embodiment of this application.

Figure 15:
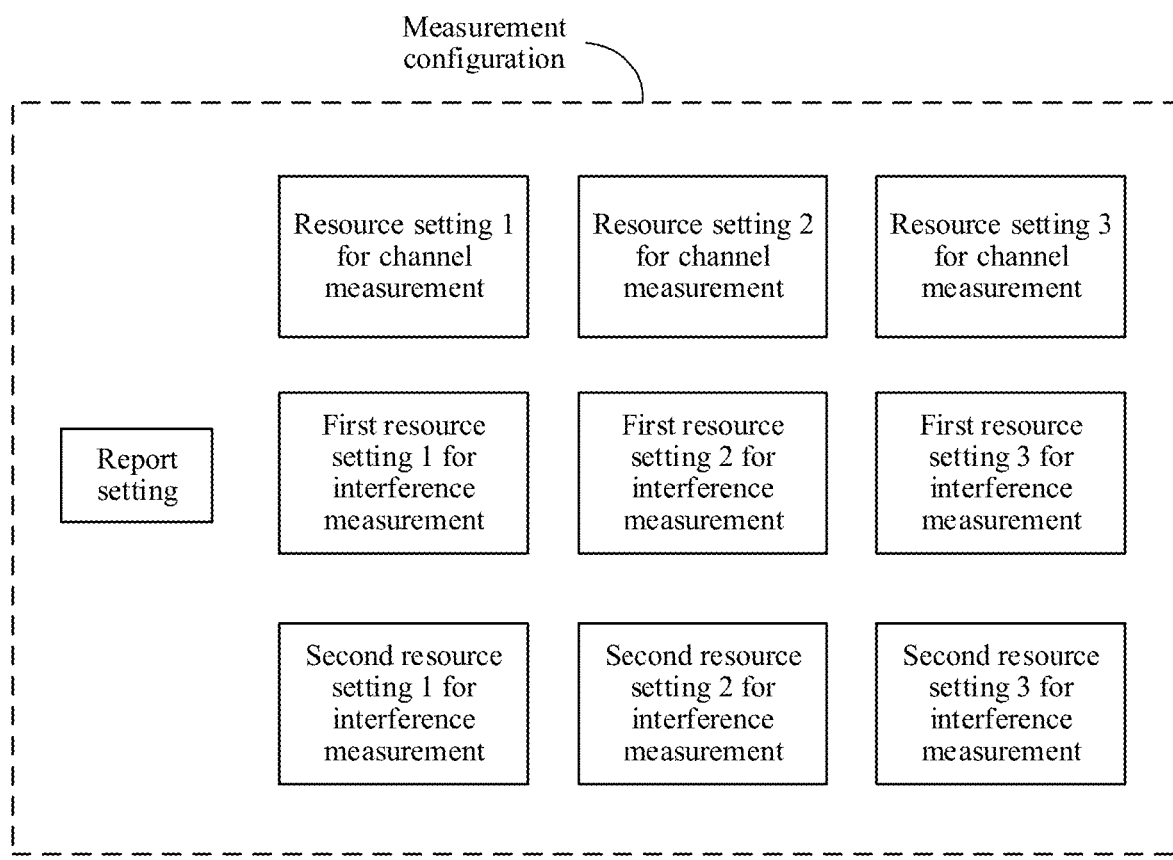
FIG. 15 is a schematic diagram of a measurement configuration according to an embodiment of this application.

For example, in FIG. 15, after receiving a report setting, the terminal device determines that a resource setting 1 for channel measurement corresponds to a second resource setting 1 for interference measurement, a resource setting 2 for channel measurement corresponds to a second resource setting 2 for interference measurement, and a resource setting 3 for channel measurement corresponds to a second resource setting 3 for interference measurement, the indication information 2 is carried in the resource setting 1 for channel measurement, the resource setting for channel measurement that is indicated by the indication information 2 is the resource setting 2 for channel measurement, and the first resource setting for interference measurement that is indicated by the other indication information is a first resource setting 3 for interference measurement.

The terminal device may determine, based on the indication information 2, that the resource settings for channel measurement in joint measurement are the resource setting 1 for channel measurement and the resource setting 2 for channel measurement. Then, the terminal device determines, based on a correspondence that is between a resource setting for channel measurement and a second resource setting for interference measurement and that is obtained from the report setting, that second resource settings for interference measurement in joint measurement are the second resource setting 1 for interference measurement and the second resource setting 2 for interference measurement.

The terminal device may determine, based on the other indication information, that a first resource setting for interference measurement in joint measurement is the first resource setting 3 for interference measurement.

(2) The indication information 2 may indicate resource sets for transmitting a CSI-RS that are configured in the plurality of resource settings for channel measurement that are required for joint measurement. For example, the indication information 2 may be identifiers of the plurality of resource settings for channel measurement and identifiers of the resource sets for transmitting a CSI-RS in the plurality of resource settings for channel measurement. For another example, when the identifiers of the resource sets for transmitting a CSI-RS in the plurality of resource settings for channel measurement are unique, the indication information may be the identifiers of the resource sets configured in the plurality of resource settings for channel measurement.

Alternatively, the indication information 2 may indicate a resource set configured in another resource setting for channel measurement other than a target resource setting for channel measurement in the plurality of resource settings for channel measurement. For example, the indication information may be an identifier of the another resource setting for channel measurement, and an identifier of a resource set for transmitting a CSI-RS in the another resource setting for channel measurement. For another example, when the identifier of the resource set for transmitting a CSI-RS in the another resource setting for channel measurement is unique, the indication information may be the identifier of the resource set configured in the another resource setting for channel measurement.

The indication information 2 may be carried in the plurality of resource settings for channel measurement, or the indication information 2 may be carried in the target resource setting for interference measurement in the plurality of resource settings for interference measurement, or the indication information may be transmitted by using separate signaling. This is not specifically limited in this application.

Correspondingly, after receiving the indication information 2, the terminal device may determine, based on the indication information 2, the resource sets configured in the plurality of resource settings for channel measurement. Further, the terminal device may determine, based on a correspondence between a resource set configured in a resource setting for channel measurement and a resource set configured in a resource setting for interference measurement, resource sets in a plurality of resource settings for interference measurement that correspond to joint measurement.

It should be noted that the resource setting for interference measurement includes a first resource setting for interference measurement and a second resource setting for interference measurement. Alternatively, the resource setting for interference measurement is a second resource setting for interference measurement.

If the resource setting for interference measurement is the second resource setting for interference measurement, and the correspondence between the resource setting for channel measurement and the resource setting for interference measurement is a correspondence between the resource setting for channel measurement and the second resource setting for interference measurement, the terminal device may determine, by using other indication information, resource sets for transmitting a CSI-RS that are configured in a plurality of first resource settings for interference measurement that are used for joint measurement. The other indication information is used to indicate the resource sets for transmitting a CSI-RS that are configured in the plurality of first resource settings for interference measurement.

The indication information 2 and the other indication information may be transmitted together or separately. This is not limited in this embodiment of this application.

For example, in FIG. 15, after receiving a report setting, the terminal device determines that a resource setting 1 for channel measurement corresponds to a second resource setting 1 for interference measurement, a resource setting 2 for channel measurement corresponds to a second resource setting 2 for interference measurement, a resource setting 3 for channel measurement corresponds to a second resource setting 3 for interference measurement, a resource set 1 in the resource setting 1 for channel measurement corresponds to a resource set 2 in the second resource setting 1 for interference measurement, and a resource set 1 in the resource setting 2 for channel measurement corresponds to a resource set 2 in the second resource setting 2 for interference measurement. Moreover, the resource settings for channel measurement that is indicated by the indication information 2 are the resource set 1 in the resource setting 1 for channel measurement and the resource set 1 in the resource setting 2 for channel measurement. The first resource setting for interference measurement that is indicated by the other indication information is a resource set 1 in a first resource setting 3 for interference measurement.

It should be noted that there may be one or more resource sets included in the resource setting for channel measurement and the resource setting for interference measurement that correspond to the report setting. This is not limited in this embodiment of this application.

The terminal device may determine, based on the indication information 2, that resource sets configured in the resource settings for channel measurement in joint measurement are the resource set 1 in the resource setting 1 for channel measurement and the resource set 1 in the resource setting 2 for channel measurement. Then, the terminal device determines, based on a correspondence that is between a resource set configured in a resource setting for channel measurement and a resource set configured in a second resource setting for interference measurement and that is obtained from the report setting, that resource sets configured in the second resource settings for interference measurement in joint measurement are the resource set 2 in the second resource setting 1 for interference measurement and the resource set 2 in the second resource setting 2 for interference measurement.

The terminal device may determine, based on the other indication information, that a first resource setting for interference measurement in joint measurement is the resource set 1 in the first resource setting 3 for interference measurement.

The indication manner 2 may be used in combination with the foregoing configuration manner. For example, the indication manner 2 may be used in combination with the configuration manner 2 or the configuration manner 1. The manner of indicating resource sets for transmitting a CSI-RS in the indication manner 2 may be used in combination with the configuration manner 3.

Indication manner 3: The indication information 3 indicates a plurality of resource settings for interference measurement that correspond to joint measurement.

Optionally, the indication information 3 may indicate the resource settings for interference measurement, or may indicate resource sets for transmitting a CSI-RS that are configured in the resource settings for interference measurement.

(1) The indication information 3 may indicate the plurality of resource settings for interference measurement that are required for joint measurement. For example, the indication information may be identifiers of the plurality of resource settings for interference measurement. Alternatively, the indication information may indicate another resource setting for interference measurement other than a target resource setting for interference measurement in the plurality of resource settings for interference measurement. For example, the indication information may be an identifier of the another resource setting for interference measurement.

The indication information 3 may be carried in the target resource setting for interference measurement, or may be carried in a measurement configuration, or may be transmitted by using separate signaling. This is not specifically limited in this embodiment of this application.

Correspondingly, after receiving the indication information 3, the terminal device may determine, based on the indication information 3, the plurality of resource settings for interference measurement. Further, the terminal device may determine, based on a correspondence between a resource setting for channel measurement and a resource setting for interference measurement, a plurality of resource settings for channel measurement that correspond to joint measurement.

It should be noted that the resource setting for interference measurement includes a first resource setting for interference measurement and a second resource setting for interference measurement. Alternatively, the resource setting for interference measurement is a second resource setting for interference measurement.

If the resource setting for interference measurement includes a first resource setting for interference measurement, and the correspondence between the resource setting for channel measurement and the resource setting for interference measurement is a correspondence between the resource setting for channel measurement and the second resource setting for interference measurement, the terminal device may determine, by using other indication information, the first resource setting for interference measurement that is used for joint measurement. The other indication information is used to indicate the first resource setting for interference measurement.

It should be noted that, if a plurality of report settings are associated with a plurality of same first interference resource measurement settings, or associated with one first interference resource measurement setting, the report setting may not include a correspondence between a first resource setting for interference measurement and a second resource setting for interference measurement, and the plurality of resource settings for interference measurement that are indicated by the indication information 3 may be a plurality of second resource settings for interference measurement.

It should be noted that, if the plurality of resource settings for interference measurement include a plurality of different first interference resource measurement settings, the plurality of resource settings for interference measurement may be a plurality of first resource settings for interference measurement or a plurality of second resource settings for interference measurement, or may be a plurality of first resource settings for interference measurement and a plurality of second resource settings for interference measurement, and the report setting may include a correspondence between a first resource setting for interference measurement and a second resource setting for interference measurement, and include a correspondence between a first resource setting for interference measurement and a resource setting for channel measurement. The plurality of resource settings for interference measurement that are indicated by the indication information 3 may be the plurality of second resource settings for interference measurement, or may be the plurality of first resource settings for interference measurement, or may be the plurality of second resource settings for interference measurement and the plurality of second resource settings for interference measurement.

It should be noted that, if the indication information 3 indicates only one of the first resource setting for interference measurement and the second resource setting for interference measurement, the other resource setting for interference measurement that is not indicated may be determined in another manner. For example, the other resource setting for interference measurement is separately indicated by using other indication information, or is indirectly determined by using an association relationship between a report setting and a resource setting. This is not limited in this embodiment of this application.

If the indication information 3 indicates the plurality of second resource settings for interference measurement, but does not indicate the plurality of first resource settings for interference measurement, the plurality of first resource settings for interference measurement may be indicated by using separate information. Alternatively, the terminal device may determine the plurality of report settings associated with the plurality of second resource settings for interference measurement, and then determine that a plurality of first resource settings for interference measurement that are associated with the plurality of report settings are first resource settings for interference measurement in joint measurement.

If the indication information 3 indicates the plurality of first resource settings for interference measurement, but does not indicate the plurality of second resource settings for interference measurement, the plurality of second resource settings for interference measurement in joint measurement may be indicated by using separate information. Alternatively, the terminal device may determine a plurality of report settings associated with the plurality of first resource settings for interference measurement, and then determine that a plurality of second resource settings for interference measurement that are associated with the plurality of report settings are second resource settings for interference measurement in joint measurement.

For example, in FIG. 15, after receiving a report setting, the terminal device determines that a resource setting 1 for channel measurement corresponds to a second resource setting 1 for interference measurement, a resource setting 2 for channel measurement corresponds to a second resource setting 2 for interference measurement, a resource setting 3 for channel measurement corresponds to a second resource setting 3 for interference measurement, the indication information 3 is carried in the second resource setting 1 for interference measurement, and the second resource setting for interference measurement that is indicated by the indication information 3 is the second resource setting 2 for interference measurement. The first resource setting for interference measurement that is indicated by the other indication information is a first resource setting 3 for interference measurement.

The terminal device may determine, based on the indication information 3, that the second resource settings for interference measurement in joint measurement are the second resource setting 1 for interference measurement and the second resource setting 2 for interference measurement. Then, the terminal device determines, based on a correspondence that is between a resource setting for channel measurement and a second resource setting for interference measurement and that is obtained from the report setting, that resource settings for channel measurement in joint measurement are the resource setting 1 for channel measurement and the resource setting 2 for channel measurement.

The terminal device may determine, based on the other indication information, that a first resource setting for interference measurement in joint measurement is the first resource setting 3 for interference measurement.

(2) The indication information 3 may indicate resource sets for transmitting a CSI-RS that are configured in the resource settings for interference measurement that are required for joint measurement. For example, the indication information 3 may be identifiers of the plurality of resource settings for interference measurement and identifiers of the resource sets for transmitting a CSI-RS in the plurality of resource settings for interference measurement. For another example, when the identifiers of the resource sets for transmitting a CSI-RS in the plurality of resource settings for interference measurement are unique, the indication information 3 may be the identifiers of the resource sets configured in the plurality of resource settings for interference measurement.

Alternatively, the indication information 3 may indicate a resource set configured in another resource setting for interference measurement other than a target resource setting for interference measurement in the plurality of resource settings for interference measurement. For example, the indication information may be an identifier of the another resource setting for interference measurement, and an identifier of a resource set for transmitting a CSI-RS in the another resource setting for interference measurement. For another example, when the identifier of the resource set for transmitting a CSI-RS in the another resource setting for interference measurement is unique, the indication information may be the identifier of the resource set configured in the another resource setting for interference measurement.

The indication information 3 may be carried in the plurality of resource settings for interference measurement, or the indication information 3 may be carried in the target resource setting for interference measurement, or the indication information may be transmitted by using separate signaling. This is not specifically limited in this application.

Correspondingly, after receiving the indication information 3, the terminal device may determine, based on the indication information 3, the resource sets configured in the plurality of resource settings for interference measurement. Further, the terminal device may determine, based on a correspondence between a resource set configured in a resource setting for channel measurement and a resource set configured in a resource setting for interference measurement, resource sets in a plurality of resource settings for channel measurement that correspond to joint measurement.

It should be noted that, if a plurality of report settings are associated with a plurality of same first interference resource measurement settings, or associated with one first interference resource measurement setting, the report setting may not include a correspondence between a first resource setting for interference measurement and a second resource setting for interference measurement, and the plurality of resource settings for interference measurement that are indicated by the indication information 3 may be a plurality of second resource settings for interference measurement.

It should be noted that, if the plurality of resource settings for interference measurement include a plurality of different first interference resource measurement settings, the plurality of resource settings for interference measurement may be a plurality of first resource settings for interference measurement or a plurality of second resource settings for interference measurement, or may be a plurality of first resource settings for interference measurement and a plurality of second resource settings for interference measurement, and the report setting may include a correspondence between a first resource setting for interference measurement and a second resource setting for interference measurement, and include a correspondence between a first resource setting for interference measurement and a resource setting for channel measurement. The plurality of resource settings for interference measurement that are indicated by the indication information 3 may be the plurality of second resource settings for interference measurement, or may be the plurality of first resource settings for interference measurement, or may be the plurality of second resource settings for interference measurement and the plurality of second resource settings for interference measurement.

It should be noted that, if the indication information 3 indicates only one of the first resource setting for interference measurement and the second resource setting for interference measurement, the other resource setting for interference measurement that is not indicated may be determined in another manner. For example, the other resource setting for interference measurement is separately indicated by using other indication information, or is indirectly determined by using an association relationship between a report setting and a resource setting. This is not limited in this embodiment of this application.

If the indication information 3 indicates the plurality of second resource settings for interference measurement, but does not indicate the plurality of first resource settings for interference measurement, the plurality of first resource settings for interference measurement may be indicated by using separate information. Alternatively, the terminal device may determine the plurality of report settings associated with the plurality of second resource settings for interference measurement, and then determine that a plurality of first resource settings for interference measurement that are associated with the plurality of report settings are first resource settings for interference measurement in joint measurement.

If the indication information 3 indicates the plurality of first resource settings for interference measurement, but does not indicate the plurality of second resource settings for interference measurement, the plurality of second resource settings for interference measurement in joint measurement may be indicated by using separate information. Alternatively, the terminal device may determine a plurality of report settings associated with the plurality of first resource settings for interference measurement, and then determine that a plurality of second resource settings for interference measurement that are associated with the plurality of report settings are second resource settings for interference measurement in joint measurement.

For example, in FIG. 15, after receiving a report setting, the terminal device determines that a resource setting 1 for channel measurement corresponds to a second resource setting 1 for interference measurement, a resource setting 2 for channel measurement corresponds to a second resource setting 2 for interference measurement, a resource setting 3 for channel measurement corresponds to a second resource setting 3 for interference measurement, a resource set 1 in the resource setting 1 for channel measurement corresponds to a resource set 2 in the second resource setting 1 for interference measurement, and a resource set 1 in the resource setting 2 for channel measurement corresponds to a resource set 2 in the second resource setting 2 for interference measurement. Moreover, the indication information 3 indicates the resource set 2 in the second resource setting 1 for interference measurement and the resource set 2 in the second resource setting 2 for interference measurement. The first resource setting for interference measurement that is indicated by the other indication information is a resource set 1 in a first resource setting 3 for interference measurement.

It should be noted that there may be one or more resource sets included in the resource setting for channel measurement and the resource setting for interference measurement that correspond to the report setting. This is not limited in this embodiment of this application.

The terminal device may determine, based on the indication information 3, that resource sets configured in the resource settings for interference measurement in joint measurement are the resource set 2 in the second resource setting 1 for interference measurement and the resource set 2 in the second resource setting 2 for interference measurement. Then, the terminal device determines, based on a correspondence that is between a resource set in a resource setting for channel measurement and a resource set in a second resource setting for interference measurement and that is obtained from the report setting, that resource sets configured in the resource settings for channel measurement in joint measurement are the resource set 1 in the resource setting 1 for channel measurement and the resource set 1 in the resource setting 2 for channel measurement.

The terminal device may determine, based on the other indication information, that a first resource setting for interference measurement in joint measurement is the resource set 1 in the first resource setting 3 for interference measurement.

The indication manner 3 may be used in combination with the three configuration manners. For example, the indication manner 3 may be used in combination with the configuration manner 1 or the configuration manner 2. The solution of indicating resource sets for transmitting a CSI-RS may be used in combination with the configuration manner 3.

Indication manner 4: The indication information 4 is used to indicate that joint measurement needs to be performed.

After receiving the indication information, the terminal device may determine that joint measurement needs to be performed.

When the indication manner 4 is combined with the configuration manner 1, after receiving the indication information 4, the terminal device may directly determine by default that resource settings associated with a plurality of report settings in a preset time period are joint measurement resource settings.

A length of the preset time period may be specified in a protocol, or may be indicated by the network device to the terminal device. This is not limited in this embodiment of this application.

When the indication manner 4 is combined with the configuration manner 2, after receiving the indication information 4, the terminal device may directly determine by default that resource settings associated with a report setting are resource settings for joint measurement.

When the indication manner 4 is combined with the configuration manner 3, after receiving the indication information 4, the terminal device may directly determine by default that a plurality of resource sets configured in a resource setting associated with a report setting are resource sets for joint measurement.

The indication information 4 may be carried in a report setting, or may be carried in a plurality of resource settings for channel measurement that are associated with the report setting, or may be carried in a plurality of resource settings for interference measurement that are associated with the report setting, or certainly may be carried in all the three types of settings.

The following describes, with reference to the indication manner 5 to the indication manner 7, several manners of indicating a resource set for joint measurement when resource setting is performed based on the configuration manner 3. In the following description, indication information 5 is used to represent indication information in an indication manner 5, indication information 6 is used to represent indication information in an indication manner 6, and indication information 7 is used to represent indication information in an indication manner 7.

Indication manner 5: The indication information 5 is used to indicate a plurality of channel measurement resource sets corresponding to joint measurement.

(1) The indication information 5 may indicate that there is a correspondence between the plurality of channel measurement resource sets, which are resource sets corresponding to joint measurement. For example, the indication information 5 may be identifiers of the plurality of channel measurement resource sets.

Correspondingly, after receiving the indication information 5, the terminal device may determine the plurality of channel measurement resource sets based on the indication information 5. Further, the terminal device may determine, based on a correspondence between a channel measurement resource set and an interference measurement resource set, a plurality of interference measurement resource sets corresponding to joint measurement.

It should be noted that the interference measurement resource set includes a first interference measurement resource set and a second interference measurement resource set. Alternatively, the interference measurement resource set is a second interference measurement resource set.

If the interference measurement resource set is the second interference measurement resource set, and the correspondence between the channel measurement resource set and the interference measurement resource set is a correspondence between the channel measurement resource set and the second interference measurement resource set, the terminal device may determine, by using other indication information, a plurality of first interference measurement resource sets used for joint measurement. The other indication information is used to indicate the plurality of first interference measurement resource sets.

The indication information 5 and the other indication information may be transmitted together or separately. This is not limited in this embodiment of this application.

The indication information 5 may be carried in the plurality of channel measurement resource sets, or may be carried in a measurement configuration, or may be carried in separate information. This is not limited in this embodiment of this application.

For example, in FIG. 7, the indication information 5 may be carried in the measurement configuration 710, and the indication information 5 is identifiers of all resource sets in the resource setting for channel measurement. After receiving the measurement configuration, the terminal device determines, based on the indication information 5, that all the resource sets in the resource setting for channel measurement are channel measurement resource sets for joint measurement.

The terminal device may determine, based on the resource sets indicated by the indication information 5 and a correspondence between a resource set configured in a resource setting for channel measurement and a resource set configured in a second resource setting for interference measurement, a second interference measurement resource set corresponding to joint measurement in the second resource setting for interference measurement.

The terminal device may determine a first interference measurement resource set based on other indication information.

(2) The indication information 5 may alternatively indicate that there is a correspondence between a target channel measurement resource set (also referred to as a "target resource set") and another channel measurement resource set (also referred to as "another resource set") other than the target resource set in the plurality of channel measurement resource sets. The target channel measurement resource set is any one of the plurality of channel measurement resource sets. For example, the indication information may be an identifier of the another channel measurement resource set.

Correspondingly, after receiving the indication information 5, the terminal device may determine the plurality of channel measurement resource sets based on the indication information 5. Further, the terminal device may determine, based on a correspondence between a channel measurement resource set and an interference measurement resource set, a plurality of interference measurement resource sets corresponding to joint measurement.

It should be noted that the interference measurement resource set includes a first interference measurement resource set and a second interference measurement resource set. Alternatively, the interference measurement resource set is a second interference measurement resource set.

If the interference measurement resource set is the second interference measurement resource set, and the correspondence between the channel measurement resource set and the interference measurement resource set is a correspondence between the channel measurement resource set and the second interference measurement resource set, the terminal device may determine, by using other indication information, a plurality of first interference measurement resource sets used for joint measurement. The other indication information is used to indicate the plurality of first interference measurement resource sets.

The indication information 5 and the other indication information may be transmitted together or separately. This is not limited in this embodiment of this application.

The indication information 5 may be carried in the plurality of channel measurement resource sets, or may be carried in a measurement configuration, or may be carried in separate information. This is not limited in this embodiment of this application.

For example, in FIG. 7, a resource set 1 in a resource setting for channel measurement corresponds to a resource set 3 in a second resource setting for interference measurement, and a resource set 2 in the resource setting for channel measurement corresponds to a resource set 4 in the second resource setting for interference measurement. The indication information 5 may be carried in the resource set 1. The indication information 5 is an identifier of the resource set 2 in the resource setting for channel measurement. The other indication information indicates a resource set 5 in a first resource setting for interference measurement.

After receiving the measurement configuration, the terminal device determines, based on the indication information 5, that the resource set 1 and the resource set 2 in the resource setting for channel measurement are channel measurement resource sets for joint measurement.

The terminal device may determine, based on the resource set 1, the resource set 2, and a correspondence between a resource set configured in a resource setting for channel measurement and a resource set configured in a second resource setting for interference measurement, that second interference measurement resource sets corresponding to joint measurement in the second resource setting for interference measurement are the resource set 3 and the resource set 4.

The terminal device may determine, based on the other indication information, that the first interference measurement resource set is the resource set 5.

Indication manner 6: The indication information 6 indicates a plurality of interference measurement resource sets corresponding to joint measurement.

(1) The indication information 6 may indicate that there is a correspondence between the plurality of interference measurement resource sets, which are resource sets corresponding to joint measurement. For example, the indication information 6 may be identifiers of the plurality of interference measurement resource sets.

Correspondingly, after receiving the indication information 6, the terminal device may determine the plurality of interference measurement resource sets based on the indication information 6. Further, the terminal device may determine, based on a correspondence between a channel measurement resource set and an interference measurement resource set, a plurality of channel measurement resource sets corresponding to joint measurement.

It should be noted that the interference measurement resource set includes a first interference measurement resource set and a second interference measurement resource set. Alternatively, the interference measurement resource set is a second interference measurement resource set.

If the interference measurement resource set is the second interference measurement resource set, and the correspondence between the channel measurement resource set and the interference measurement resource set is a correspondence between the channel measurement resource set and the second interference measurement resource set, the terminal device may determine, by using other indication information, a plurality of first interference measurement resource sets used for joint measurement. The other indication information is used to indicate the plurality of first interference measurement resource sets.

The indication information 6 and the other indication information may be transmitted together or separately. This is not limited in this embodiment of this application.

The indication information 6 may be carried in the plurality of interference measurement resource sets, or may be carried in a measurement configuration, or may be carried in separate information. This is not limited in this embodiment of this application.

For example, in FIG. 7, the indication information 6 may be carried in the measurement configuration 710, and the indication information 6 is identifiers of all resource sets in the first resource setting for interference measurement and the second resource setting for interference measurement. After receiving the measurement configuration, the terminal device determines, based on the indication information 6, that all the resource sets in the first resource setting for interference measurement and the second resource setting for interference measurement are interference measurement resource sets for joint measurement.

The terminal device may determine, based on the resource sets indicated by the indication information 6 and a correspondence between a resource set configured in a resource setting for channel measurement and a resource set configured in a second resource setting for interference measurement, a channel measurement resource set corresponding to joint measurement in the resource setting for channel measurement.

For another example, in FIG. 7, the indication information 6 may be carried in the measurement configuration 710, and the indication information 6 is identifiers of all resource sets in the second resource setting for interference measurement. After receiving the measurement configuration, the terminal device determines, based on the indication information 6, that all the resource sets in the second resource setting for interference measurement are interference measurement resource sets for joint measurement.

The terminal device may determine, based on the resource sets indicated by the indication information 6 and a correspondence between a resource set configured in a resource setting for channel measurement and a resource set configured in a second resource setting for interference measurement, a channel measurement resource set corresponding to joint measurement in the resource setting for channel measurement.

The terminal device may determine a first interference resource set for joint measurement by using other indication information.

(2) The indication information 6 may alternatively indicate that there is a correspondence between a target interference measurement resource set (also referred to as a "target resource set") and another interference measurement resource set (also referred to as "another resource set") other than the target resource set in the plurality of interference measurement resource sets. The target interference measurement resource set is any one of the plurality of interference measurement resource sets. For example, the indication information may be an identifier of the another interference measurement resource set.

Correspondingly, after receiving the indication information 6, the terminal device may determine the plurality of interference measurement resource sets based on the indication information 6. Further, the terminal device may determine, based on a correspondence between an interference measurement resource set and an interference measurement resource set, a plurality of interference measurement resource sets corresponding to joint measurement.

It should be noted that the interference measurement resource set includes a first interference measurement resource set and a second interference measurement resource set. Alternatively, the interference measurement resource set is a second interference measurement resource set.

If the interference measurement resource set is the second interference measurement resource set, and the correspondence between the channel measurement resource set and the interference measurement resource set is a correspondence between the channel measurement resource set and the second interference measurement resource set, the terminal device may determine, by using other indication information, a plurality of first interference measurement resource sets used for joint measurement. The other indication information is used to indicate the plurality of first interference measurement resource sets.

The indication information 6 and the other indication information may be transmitted together or separately. This is not limited in this embodiment of this application.

The indication information 6 may be carried in the plurality of interference measurement resource sets, or may be carried in a measurement configuration, or may be carried in separate information. This is not limited in this embodiment of this application.

For example, in FIG. 7, a resource set 1 in a resource setting for channel measurement corresponds to a resource set 3 in a second resource setting for interference measurement, and a resource set 2 in the resource setting for channel measurement corresponds to a resource set 4 in the second resource setting for interference measurement. The indication information 6 may be carried in the resource set 3 in the second resource setting for interference measurement. The indication information 6 is an identifier of the resource set 4 in the second resource setting for interference measurement. The other indication information indicates a resource set 5 in a first resource setting for interference measurement.

After receiving the measurement configuration, the terminal device determines, based on the indication information 6, that the resource set 3 and the resource set 4 in the second resource setting for interference measurement are second interference measurement resource sets for joint measurement.

The terminal device may determine, based on the resource set 3, the resource set 4, and a correspondence between a resource set configured in a resource setting for channel measurement and a resource set configured in a second resource setting for interference measurement, that channel measurement resource sets corresponding to joint measurement in the resource setting for channel measurement are the resource set 1 and the resource set 2.

The terminal device may determine, based on the other indication information, that a first interference measurement resource set is the resource set 5.

Indication manner 7: The indication information 7 is used to indicate all resource sets required for joint measurement, which include the channel measurement resource sets and the interference measurement resource sets.

(1) The indication information 7 indicates that there is a correspondence between the plurality of resource sets, which are resource sets corresponding to joint measurement. For example, the indication information 7 may be identifiers of the plurality of resource sets.

Correspondingly, after receiving the indication information 7, the terminal device may determine, based on the indication information 7, the plurality of resource sets, including a plurality of channel measurement resource sets, second interference measurement resource sets, and first interference measurement resource sets.

The indication information 7 may be carried in the plurality of resource sets, or may be carried in a measurement configuration, or may be carried in separate information. This is not limited in this embodiment of this application.

For example, in FIG. 7, the indication information 7 may be carried in the measurement configuration 710, and the indication information 7 is identifiers of all resource sets in the resource setting for channel measurement, the first resource setting for interference measurement, and the second resource setting for interference measurement. After receiving the measurement configuration, the terminal device determines all resource sets for joint measurement based on the indication information 7.

(2) The indication information 7 may alternatively indicate there is a correspondence between a target resource set and another resource set other than the target resource set in the plurality of resource sets. The target resource set is any one of the plurality of resource sets. For example, the indication information may be an identifier of the another resource set.

The indication information 7 may be carried in the target resource set. Correspondingly, after receiving the indication information 7, the terminal device may determine that the another resource set indicated by the indication information 7 and the target resource set carrying the indication information 7 are a plurality of resource sets for joint measurement.

For example, in FIG. 7, the indication information 7 may be carried in the resource set 1 in the resource setting for channel measurement, and the indication information 7 is an identifier of another resource set other than the resource set 1 in the resource setting for channel measurement, and identifiers of all resource sets in the second resource setting for interference measurement and the first resource setting for interference measurement.

After receiving the measurement configuration, the terminal device determines, based on the indication information 7, that the resource set 1, the another resource set, and all the resource sets in the second resource setting for interference measurement and the first resource setting for interference measurement are channel measurement resource sets for joint measurement.

Figure 8:
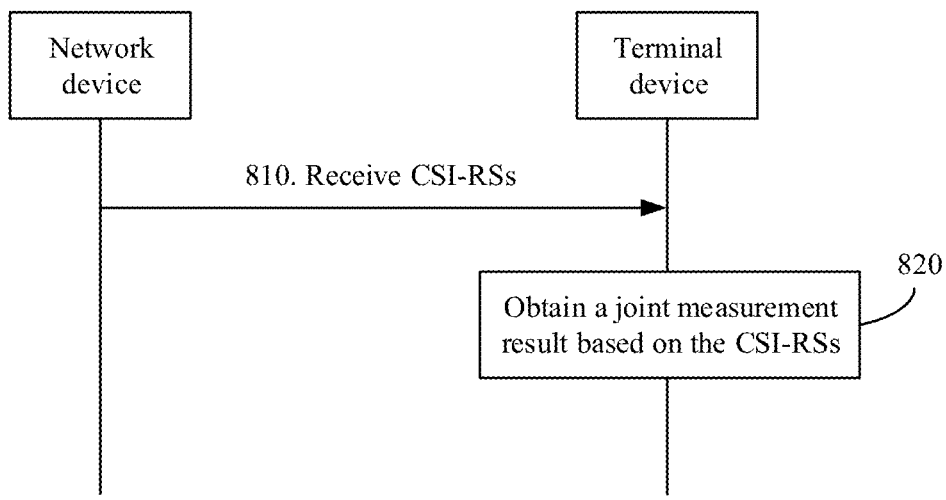
FIG. 8 is a schematic flowchart of a channel measurement method according to an embodiment of this application.

The following describes, with reference to FIG. 8, a joint measurement method provided in an embodiment of this application. FIG. 8 is a schematic flowchart of a channel measurement method according to an embodiment of this application. The method shown in FIG. 8 includes step 810 to step 820.

810. A terminal device receives CSI-RSs.

Resources for receiving the CSI-RSs by the terminal device may be configured by a network device for the terminal device with reference to the foregoing three configuration manners, or may be configured in another configuration manner. This is not limited in this embodiment of this application.

820. The terminal device obtains a joint measurement result based on the CSI-RSs.

There are many manners for obtaining a joint measurement result by the terminal device, and a joint measurement process of the terminal is not limited in the present invention.

For example, the terminal device may directly accumulate the plurality of channel measurement results to obtain a joint channel measurement result, and the terminal device directly accumulates the plurality of interference measurement results to obtain a joint interference measurement result, and then obtains the joint measurement result based on the joint channel measurement result and the joint interference measurement result.

For another example, in a process of obtaining the joint channel measurement result and the joint interference measurement result through accumulation, the terminal device may perform the accumulation based on a redundancy version (RV) combination, to obtain the joint channel measurement result and the joint interference measurement result. Then, the terminal device obtains a joint CSI measurement result, that is, the joint measurement result, based on the joint channel measurement result and the joint interference measurement result.

For another example, the terminal device may obtain a plurality of channel state measurement results based on the CSI-RSs, and then accumulate the plurality of channel state measurement results based on an RV combination, to obtain the joint measurement result. Each of the plurality of channel state measurement results may be obtained based on CSI-RSs transmitted on a channel measurement resource and an interference measurement resource that are in a correspondence.

Optionally, each channel state measurement result may correspond to one network device participating in coordinated transmission. In other words, the plurality of channel state measurement results are respectively channel state measurement results of a plurality of network devices participating in coordinated transmission.

The RV combination may include RVs used to transmit CSI-RSs on resources configured in a plurality of resource settings for channel measurement that are required for joint measurement. Optionally, the RV combination may be RVs used by plurality of network devices participating in coordinated transmission to transmit CSI-RSs used for channel measurement.

It should be understood that a quantity of RVs included in the RV combination may be the same as a quantity of a plurality of joint measurement resources. Optionally, the quantity of RVs included in the RV combination may be a quantity of the network devices participating in coordinated transmission.

In this embodiment of this application, the terminal device may generate a CSI group based on a combination of RVs. In other words, in a process of generating the CSI group, a transmission gain brought by the RVs is considered, thereby improving accuracy of the CSI group.

There are many manners for determining the RV combination. For example, the RV combination may be indicated by the network device to the terminal device, or the RV combination may be determined by the terminal device autonomously, or the RV combination may be specified in a communications protocol. This is not limited in this embodiment of this application. Several possible manners of indicating an RV combination are described below.

Manner 1 of indicating an RV combination: The RV combination may be indicated by the network device to the terminal device, or may be preset. When the RV combination is indicated by the network device, the network device may indicate the RV combination to the terminal device by using dedicated signaling. The network device may alternatively add indication information indicating the RV combination to a measurement configuration. For example, the indication information of the RV combination is {RV1, RV2}. RV1 and RV2 are version numbers of RVs. The network device may alternatively indicate the RV combination by using a number of the RV combination. Different numbers indicate different RV combinations.

The following specifically describes, with reference to the foregoing three configuration manners, three optional manners of indicating an RV combination.

Based on the configuration manner 1, indication information of an RV combination may be added to at least one of the plurality of report settings. Alternatively, each of the plurality of report settings carries indication information used to indicate an RV used to transmit data on a channel corresponding to the report setting. In this way, a plurality of RVs determined based on the plurality of report settings form an RV combination.

It should be noted that the indication information of the RV combination may alternatively be added to the resource settings for channel measurement that are associated with the plurality of report settings, or the indication information of the RV combination may be added to the resource settings for interference measurement that are associated with the plurality of report settings. This is not limited in this embodiment of this application.

Based on the configuration manner 2, indication information of an RV combination may be added to at least one of the plurality of resource settings for channel measurement. Alternatively, each of the plurality of resource settings for channel measurement carries indication information used to indicate an RV used to transmit data on a channel corresponding to the resource setting for channel measurement. In this way, a plurality of RVs determined based on the plurality of resource settings for channel measurement form an RV combination.

It should be noted that the indication information of the RV combination may be added to the plurality of second resource settings for interference measurement or the report setting. This is not limited in this embodiment of this application.

Based on the configuration manner 3, indication information of an RV combination may be added to at least one of the plurality of resource sets. Alternatively, each of the plurality of resource sets carries indication information used to indicate an RV used to transmit data on a channel corresponding to the resource setting for channel measurement. In this way, a plurality of RVs determined based on the plurality of resource sets form an RV combination.

It should be noted that the indication information of the RV combination may be added to the second resource setting for interference measurement, the report setting, or the resource setting for channel measurement. This is not limited in this embodiment of this application.

In this embodiment of this application, the network device indicates the RV combination actually used by the terminal device, to improve accuracy of the CSI group generated by the terminal device.

Manner 2 of indicating an RV combination: When the RV combination is preset, the terminal device may use an RV combination specified in a communications protocol as an RV combination used by the terminal device to perform synthesis to obtain a joint measurement result. For example, based on the configuration manner 1, two report settings are included. It is specified in a protocol that in the two report settings, an RV corresponding to a first report setting is RV1, and an RV corresponding to a second report setting is RV2.

In this embodiment of this application, the RV combination is preset, to reduce transmission overheads caused by the network device indicating the RV combination to the terminal device.

Manner 3 of indicating an RV combination: The RV combination may alternatively be determined by the terminal device autonomously. The following describes in detail two manners in which the terminal device autonomously determines an RV combination.

Autonomous determining manner 1: An RV combination is randomly selected from a plurality of preset RV combinations as an RV combination used by the terminal device to perform synthesis to obtain a joint measurement result.

Autonomous determining manner 2: The terminal device may obtain a joint measurement result based on each of the plurality of preset RV combinations, and use a plurality of joint measurement results based on the plurality of RV combinations as a CSI group. Optionally, the plurality of preset RV combinations may include RV combinations in all possible manners.

It should be noted that the two manners of autonomously determining an RV combination may be specified based on a communications protocol, or may be indicated by the network device to the terminal device, that is, the network device indicates, by using indication information, an autonomous determining manner used by the terminal device. This is not limited in this embodiment of this application.

Optionally, the indication information used by the network device to indicate the autonomous determining manner used by the terminal device may be carried in RRC signaling, or may be carried in a report setting, or may be carried in separate signaling. This is not limited in this embodiment of this application.

Correspondingly, the determining, by the terminal device, an RV combination in an autonomous determining manner may be specified based on a protocol, or may be indicated by the network device, that is, the network device indicates the terminal device to determine an RV combination in an autonomous determining manner.

It should be noted that RVs included in the RV combination may be the same or may be different. This is not limited in this application.

830. The terminal device sends the CSI group, where the CSI group includes a combined measurement result.

CSI in the CSI group is used to indicate a measurement result of joint measurement performed by the terminal device based on the CSI-RSs. The CSI group may include one or more pieces of CSI.

If the CSI group includes the plurality of joint measurement results obtained through synthesis based on the plurality of RV combinations, the terminal device may further send RV combination indication information to the network device, to indicate the RV combinations used to perform synthesis to obtain the plurality of joint measurement results. Specifically, the RV combination indication information may be indexes of the RV combinations in the plurality of RV combinations, and the network device and the terminal device may prestore the plurality of RV combinations.

For example, if each RV combination includes two different RV numbers, the plurality of RV combinations may include eight RV combinations: {0, 1}, {0, 2}, {0, 3}, {1, 2}, {1, 3}, {2, 3}, {2, 4}, and {3, 4}. Then, the terminal device may obtain a joint measurement result based on each of the eight RV combinations, to generate a CSI group.

The foregoing describes in detail the channel measurement configuration method in the embodiments of this application with reference to FIG. 1 to FIG. 8 and FIG. 15. The following describes in detail a channel measurement configuration apparatus in the embodiments of this application with reference to FIG. 9 to FIG. 14. It should be noted that the apparatuses shown in FIG. 9 to FIG. 14 may implement the steps in the foregoing methods. For brevity, details are not described herein again.

Figure 9:
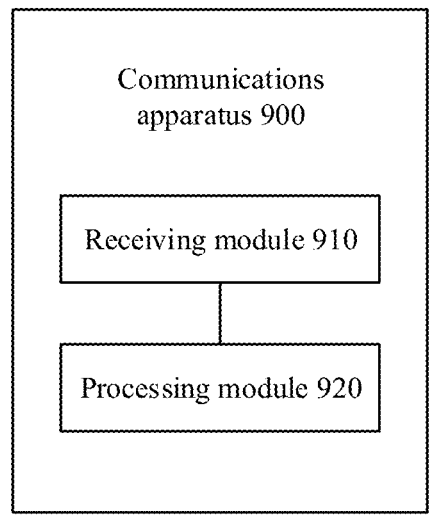
FIG. 9 is a schematic block diagram of a communications apparatus according to an embodiment of this application.

FIG. 9 is a schematic block diagram of a communications apparatus according to an embodiment of this application. The communications apparatus 900 shown in FIG. 9 includes a receiving module 910 and a processing module 920.

The receiving module 910 is configured to receive a measurement configuration, where the measurement configuration includes a plurality of resource settings, and the plurality of resource settings include a plurality of resource settings for channel measurement and a plurality of resource settings for interference measurement.

The receiving module 910 is further configured to receive channel state information reference signals CSI-RSs on resources configured in the plurality of resource settings.

The processing module 920 is configured to generate a CSI group based on the CSI-RSs, where the CSI group includes one or more pieces of CSI.

Optionally, in an embodiment, the plurality of resource settings for interference measurement include one first resource setting for interference measurement, and the first resource setting for interference measurement is used to configure a resource set used to transmit a zero-power ZP CSI-RS.

Optionally, in an embodiment, the plurality of resource settings for interference measurement include a plurality of second resource settings for interference measurement, the second resource setting for interference measurement is used to configure a resource set used to transmit a non-zero-power NZP CSI-RS, the measurement configuration includes a plurality of report settings, different report settings in the plurality of report settings are associated with different resource settings in the plurality of second resource settings for interference measurement, and different report settings in the plurality of report settings are associated with different resource settings in the plurality of resource settings for channel measurement.

Optionally, in an embodiment, the plurality of report settings include a target report setting and another report setting, and
    the receiving module 910 is specifically configured to receive the first indication information, where the first indication information is used to indicate that there is a correspondence between the target report setting and the another report setting, and the first indication information and the measurement configuration are transmitted separately or together.

Optionally, in an embodiment, the first indication information may be carried in the target report setting, and the first indication information is an identifier of the another report setting.

Optionally, in an embodiment, each of the plurality of report settings carries indication information used to indicate a redundancy version RV.

Optionally, in an embodiment, the measurement configuration includes a first report setting, the first report setting is associated with the plurality of resource settings for channel measurement, and the first report setting is associated with the plurality of resource settings for interference measurement.

Optionally, in an embodiment, the plurality of resource settings for interference measurement include a target resource setting for interference measurement and another resource setting for interference measurement, and
    the receiving module 910 is specifically configured to receive second indication information, where the second indication information is used to indicate that there is a correspondence between a resource set in the target resource setting for interference measurement and a resource set in the another resource setting for interference measurement, and the second indication information and the measurement configuration are transmitted separately or together.

Optionally, in an embodiment, the second indication information may be carried in the target resource setting for interference measurement, and the second indication information is an identifier of a resource set that is in the another resource setting for interference measurement and that is used to transmit a CSI-RS.

Optionally, in an embodiment, the plurality of resource settings for channel measurement include a target resource setting for channel measurement and another resource setting for channel measurement, and the receiving module 910 is specifically configured to receive third indication information, where the third indication information is used to indicate that there is a correspondence between a resource set in the target resource setting for channel measurement and a resource set in the another resource setting for channel measurement, and the third indication information and the measurement configuration are transmitted separately or together.

Optionally, in an embodiment, the third indication information may be carried in the target resource setting for channel measurement, and the third indication information is an identifier of a resource set that is in the another resource setting for channel measurement and that is used to transmit a CSI-RS.

Optionally, in an embodiment, each of the plurality of resource settings for channel measurement carries indication information used to indicate an RV, and/or each of the plurality of resource settings for interference measurement carries indication information used to indicate an RV.

Optionally, in an embodiment, the processing module 920 is specifically configured to generate the CSI group based on the CSI-RSs and a combination of one or more RVs.

Optionally, in an embodiment, the apparatus further includes a sending module, configured to send the CSI group and fourth indication information, where the fourth indication information is used to indicate the combination of RVs used to generate each piece of CSI in the CSI group.

In this embodiment of this application, the receiving module and the sending module may be combined as a transceiver module.

Figure 10:
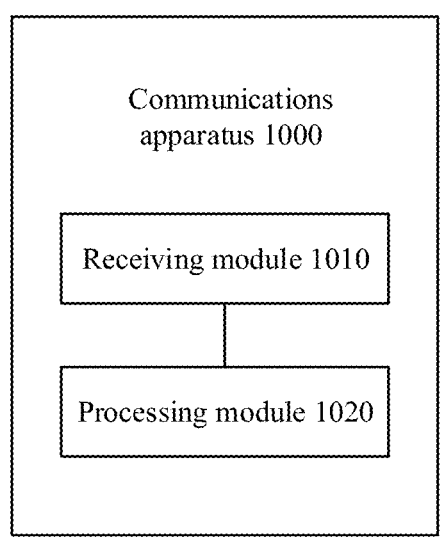
FIG. 10 is a schematic diagram of a communications apparatus according to an embodiment of this application.

FIG. 10 is a schematic diagram of a communications apparatus according to an embodiment of this application. The communications apparatus 1000 shown in FIG. 10 includes a receiving module 1010 and a processing module 1020.

The receiving module 1010 is configured to receive a measurement configuration, where the measurement configuration includes a plurality of resource sets used to transmit a channel state information reference signal CSI-RS.

The receiving module 1010 is configured to receive CSI-RSs on resources included in the plurality of resource sets.

The processing module 1020 is configured to generate a CSI group based on the CSI-RSs, where the CSI group includes one or more pieces of CSI.

Optionally, in an embodiment, the measurement configuration includes a first report setting, the second report setting is associated with a resource setting for channel measurement and a resource setting for interference measurement, and the resource setting for channel measurement and the resource setting for interference measurement include the plurality of resource sets.

Optionally, in an embodiment, the resource setting for interference measurement includes a resource set used to transmit a zero-power ZP CSI-RS.

Optionally, in an embodiment, resource sets included in the resource setting for channel measurement include a target resource set and another resource set, and the receiving module 1010 is configured to receive fifth indication information, where the fifth indication information is used to indicate that there is a correspondence between the target resource set and the another resource set, and the fifth indication information and the measurement configuration are transmitted separately or together.

Optionally, in an embodiment, each of the plurality of resource sets included in the resource setting for channel measurement carries indication information used to indicate a redundancy version RV.

Optionally, in an embodiment, the processing module 1020 is configured to generate the CSI group based on the CSI-RSs and a combination of one or more RVs.

Optionally, in an embodiment, the apparatus further includes a sending module, configured to send the CSI group and sixth indication information, where the sixth indication information is used to indicate the combination of RVs used to generate each piece of CSI in the CSI group.

Figure 11:
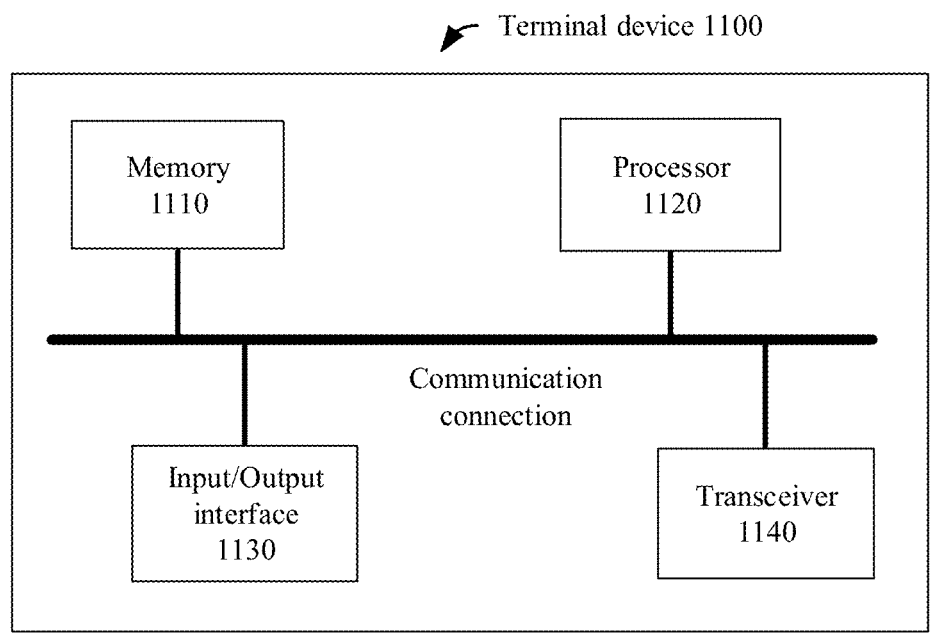
FIG. 11 is a schematic block diagram of a terminal device according to another embodiment of this application.

In an optional embodiment, the receiving module 910 may be a transceiver 1140, the processing module 920 may be a processor 1120, and the terminal device may further include an input/output interface 1130 and a memory 1110, which are specifically shown in FIG. 11.

In an optional embodiment, the receiving module 1010 may be a transceiver 1140, the processing module 1020 may be a processor 1120, and the terminal device may further include an input/output interface 1130 and a memory 1110, which are specifically shown in FIG. 11.

FIG. 11 is a schematic block diagram of a terminal device according to another embodiment of this application. The terminal device 1100 shown in FIG. 11 may include: a memory 1110, a processor 1120, an input/output interface 1130, and a transceiver 1140. The memory 1110, the processor 1120, the input/output interface 1130, and the transceiver 1140 are connected by using an internal connection path, the memory 1110 is configured to store instructions, and the processor 1120 is configured to execute the instructions stored in the memory 1120, to control the input/output interface 1130 to receive input data and information and output data such as an operation result, and control the transceiver 1140 to send a signal.

In an implementation process, steps in the foregoing methods can be implemented by using a hardware integrated logical circuit in the processor 1120, or by using instructions in a form of software. The method disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 1110, and the processor 1120 reads information in the memory 1110 and completes the steps in the foregoing methods in combination with the hardware of the processor. To avoid repetition, details are not described herein again.

Figure 12:
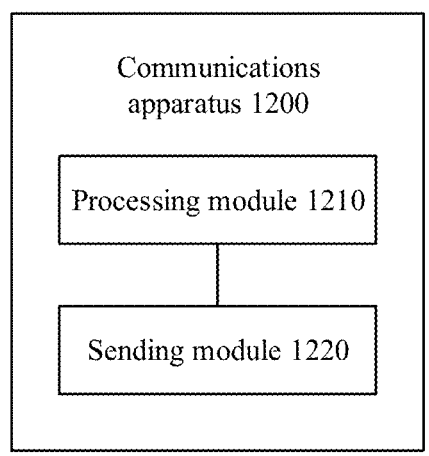
FIG. 12 is a schematic block diagram of a communications apparatus according to an embodiment of this application.

FIG. 12 is a schematic block diagram of a communications apparatus according to an embodiment of this application. The communications apparatus 1200 shown in FIG. 12 includes a processing module 1210 and a sending module 1220.

The processing module 1210 is configured to generate a measurement configuration, where the measurement configuration includes a plurality of resource settings, and the plurality of resource settings include a plurality of resource settings for channel measurement and a plurality of resource settings for interference measurement.

The sending module 1220 is configured to send the measurement configuration to a terminal device.

Optionally, in an embodiment, the plurality of resource settings for interference measurement include a resource set used to transmit a zero-power ZP CSI-RS.

Optionally, in an embodiment, the measurement configuration includes a plurality of report settings, different report settings in the plurality of report settings are associated with different resource settings in the plurality of resource settings for channel measurement, and different report settings in the plurality of report settings are associated with different resource settings in the plurality of resource settings for interference measurement.

Optionally, in an embodiment, the plurality of report settings include a target report setting and another report setting, and the sending module 1220 is configured to send first indication information to the terminal device, where the first indication information is used to indicate that there is a correspondence between the target report setting and the another report setting, and the first indication information and the measurement configuration are transmitted separately or together.

Optionally, in an embodiment, the first indication information may be carried in the target report setting, and the first indication information is an identifier of the another report setting.

Optionally, in an embodiment, each of the plurality of report settings carries a version number of a redundancy version RV.

Optionally, in an embodiment, the measurement configuration includes a first report setting, the first report setting is associated with the plurality of resource settings for channel measurement, and the first report setting is associated with the plurality of resource settings for interference measurement.

Optionally, in an embodiment, the plurality of resource settings for interference measurement include a target resource setting for interference measurement and another resource setting for interference measurement, and the sending module 1220 is configured to send second indication information to the terminal device, where the second indication information is used to indicate that there is a correspondence between a resource set in the target resource setting for interference measurement and a resource set in the another resource setting for interference measurement, and the second indication information and the measurement configuration are transmitted separately or together.

Optionally, in an embodiment, the second indication information may be carried in the target resource setting for interference measurement, and the second indication information is an identifier of a resource set that is in the another resource setting for interference measurement and that is used to transmit a CSI-RS.

Optionally, in an embodiment, the plurality of resource settings for channel measurement include a target resource setting for channel measurement and another resource setting for channel measurement, and the sending module 1220 is configured to send third indication information to the terminal device, where the third indication information is used to indicate that there is a correspondence between a resource set in the target resource setting for channel measurement and a resource set in the another resource setting for channel measurement, and the third indication information and the measurement configuration are transmitted separately or together.

Optionally, in an embodiment, the third indication information may be carried in the target resource setting for channel measurement, and the third indication information is an identifier of a resource set that is in the another resource setting for channel measurement and that is used to transmit a CSI-RS.

Optionally, in an embodiment, each of the plurality of resource settings for channel measurement carries a version number of an RV, and/or each of the plurality of resource settings for interference measurement carries a version number of an RV.

Optionally, in an embodiment, the apparatus further includes a receiving module, configured to receive a CSI group and fourth indication information that are sent by the terminal device, where the CSI group includes one or more pieces of CSI, and the fourth indication information is used to indicate a combination of RVs used to generate each piece of CSI in the CSI group.

In this embodiment of this application, the sending module and the receiving module may be combined as a transceiver module.

Figure 13:
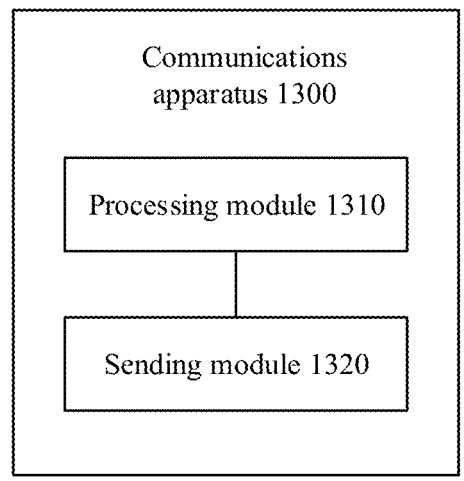
FIG. 13 is a schematic block diagram of a communications apparatus according to an embodiment of this application.

FIG. 13 is a schematic block diagram of a communications apparatus according to an embodiment of this application. The communications apparatus 1300 shown in FIG. 13 includes a processing module 1310 and a sending module 1320.

The processing module 1310 is configured to generate a measurement configuration, where the measurement configuration includes a plurality of resource sets used to transmit a channel state information reference signal CSI-RS.

The sending module 1320 is configured to send the measurement configuration to a terminal device.

Optionally, in an embodiment, the measurement configuration includes a second report setting, the second report setting is associated with a resource setting for channel measurement and a resource setting for interference measurement, and the resource setting for channel measurement and the resource setting for interference measurement include the plurality of resource sets.

Optionally, in an embodiment, the resource setting for interference measurement includes a resource set used to transmit a zero-power ZP CSI-RS.

Optionally, in an embodiment, the resource sets included in the resource setting for channel measurement include a target resource set and another resource set, and the sending module 1320 is configured to send fifth indication information to the terminal device, where the fifth indication information is used to indicate that there is a correspondence between the target resource set and the another resource set, and the first indication information and the measurement configuration are transmitted separately or together.

Optionally, in an embodiment, the fifth indication information may be carried in the target resource set, and each of the plurality of resource sets included in the resource setting for channel measurement carries an RV number.

Optionally, in an embodiment, the apparatus further includes a receiving module, configured to receive a CSI group and sixth indication information that are sent by the terminal device, where the CSI group includes one or more pieces of CSI, and the sixth indication information is used to indicate a combination of RVs used to generate each piece of CSI in the CSI group.

Figure 14:
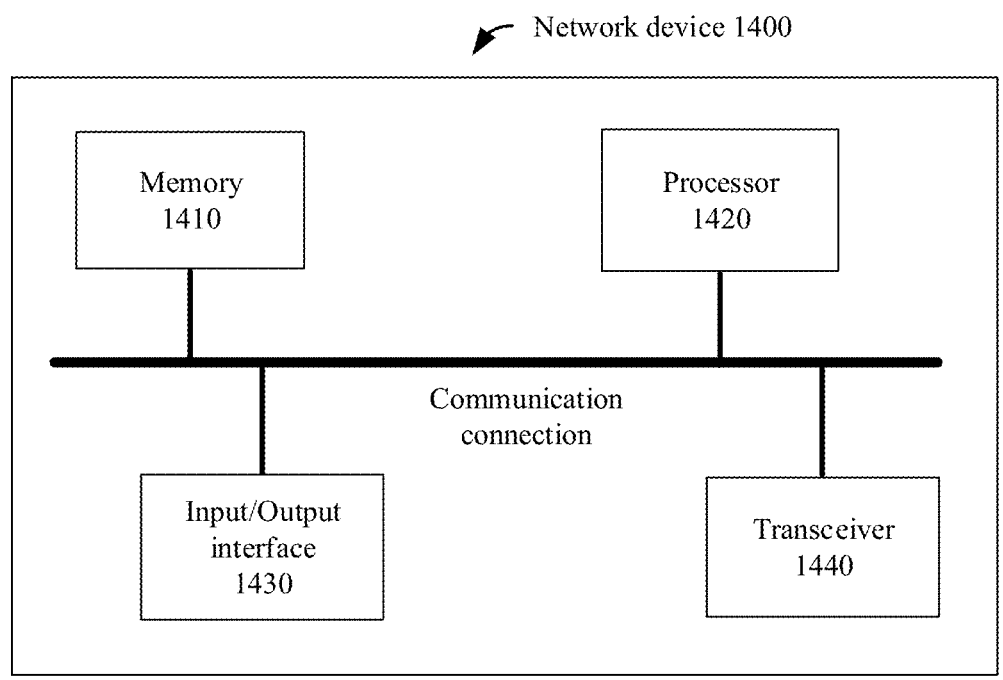
FIG. 14 is a schematic block diagram of a network device according to another embodiment of this application.

In an optional embodiment, the processing module 1210 may be a processor 1020, the sending module 1320 may be a transceiver 1440, and the network device may further include an input/output interface 1430 and a memory 1410, which are specifically shown in FIG. 14.

In an optional embodiment, the processing module 1310 may be a processor 1020, the sending module 1320 may be a transceiver 1440, and the network device may further include an input/output interface 1430 and a memory 1410, which are specifically shown in FIG. 14.

FIG. 14 is a schematic block diagram of a network device according to another embodiment of this application. The network device 1400 shown in FIG. 14 may include: a memory 1410, a processor 1420, an input/output interface 1430, and a transceiver 1440. The memory 1410, the processor 1420, the input/output interface 1430, and the transceiver 1440 are connected by using an internal connection path, the memory 1410 is configured to store instructions, and the processor 1420 is configured to execute the instructions stored in the memory 1420, to control the input/output interface 1430 to receive input data and information and output data such as an operation result, and control the transceiver 1440 to send a signal.

In an implementation process, steps in the foregoing methods can be implemented by using a hardware integrated logical circuit in the processor 1420, or by using instructions in a form of software. The method disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 1410, and the processor 1420 reads information in the memory 1410 and completes the steps in the foregoing methods in combination with the hardware of the processor. To avoid repetition, details are not described herein again.

It should be understood that, the processor in the embodiments of this application may be a central processing unit (CPU), or may alternatively be another general-purpose processor, a digital signal processor (DSP), an application-specific integrated circuit (ASIC), a field programmable gate array (FPGA), or another programmable logic device, a discrete gate or transistor logic device, a discrete hardware component, or the like. The general-purpose processor may be a microprocessor, or the processor may be any conventional processor or the like.

It should be understood that, in the embodiments of this application, the transceiver is also referred to as a communications interface, and a transceiver apparatus, for example but not limited to, a transceiver, is used to implement communication between a communication device (for example, a terminal device or a network device) and another device or a communications network.

It should further be understood that in the embodiments of this application, the memory may include a read-only memory and a random access memory, and provide instructions and data to the processor. A part of the processor may further include a non-volatile random access memory. For example, the processor may further store information of a device type.

It should be understood that in the embodiments of this application, "B corresponding to A" indicates that B is associated with A, and B may be determined according to A. However, it should further be understood that determining B according to A does not mean that B is determined according to A only. That is, B may alternatively be determined according to A and/or other information.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

In the several embodiments provided in this application, it should be understood that the disclosed system, apparatus, and method may be implemented in other manners. For example, the described apparatus embodiment is merely an example. For example, division into the unit is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A channel measurement configuration method, comprising:
   receiving, by a terminal device, a measurement configuration, wherein the measurement configuration comprises a plurality of resource settings, and the plurality of resource settings comprise a plurality of resource settings for channel measurement and a plurality of resource settings for interference measurement;
   receiving, by the terminal device, channel state information reference signals (CSI-RSs) on resources configured in the plurality of resource settings; and
   generating, by the terminal device, a CSI group by performing a joint channel and interference measurement based on the CSI-RSs on the resources configured in the plurality of resource settings for channel measurement and the plurality of resource settings for interference measurement, wherein the CSI group comprises one or more pieces of CSI, and
   wherein the terminal device is in a coordinated transmission scenario.

2. The method according to claim 1, wherein the plurality of resource settings for interference measurement comprise a first resource setting for interference measurement, and the first resource setting for interference measurement is used to configure a resource set used to transmit a zero-power CSI-RS (ZP CSI-RS).

3. The method according to claim 1, wherein the plurality of resource settings for interference measurement further comprise a plurality of second resource settings for interference measurement, each of the plurality of second resource settings for interference measurement is used to configure a resource set used to transmit a non-zero-power CSI-RS (NZP CSI-RS), the measurement configuration further comprises a plurality of report settings, different report settings in the plurality of report settings are associated with different resource settings in the plurality of second resource settings for interference measurement, and different report settings in the plurality of report settings are associated with different resource settings in the plurality of resource settings for channel measurement.

4. The method according to claim 3, wherein the plurality of report settings comprise a target report setting and another report setting; and the method further comprises:
   receiving, by the terminal device, first indication information, wherein the first indication information is used to indicate that there is a correspondence between the target report setting and the other report setting, and the first indication information and the measurement configuration are transmitted separately or together.

5. The method according to claim 3, wherein each of the plurality of report settings carries indication information used to indicate a redundancy version (RV).

6. The method according to claim 1, wherein the measurement configuration further comprises a first report setting, the first report setting is associated with the plurality of resource settings for channel measurement, and the first report setting is associated with the plurality of resource settings for interference measurement.

7. A communications apparatus, comprising:
   a transceiver, configured to receive a measurement configuration, wherein the measurement configuration comprises a plurality of resource settings, and the plurality of resource settings comprise a plurality of resource settings for channel measurement and a plurality of resource settings for interference measurement, wherein
   the transceiver is further configured to receive channel state information reference signals (CSI-RSs) on resources configured in the plurality of resource settings; and
   a processor, configured to generate a CSI group by performing a joint channel and interference measurement based on the CSI-RSs on the resources configured in the plurality of resource settings for channel measurement and the plurality of resource settings for interference measurement, wherein the CSI group comprises one or more pieces of CSI, and
   wherein the communications apparatus is in a coordinated transmission scenario.

8. The communications apparatus according to claim 7, wherein the plurality of resource settings for interference measurement comprise a first resource setting for interference measurement, and the first resource setting for interference measurement is used to configure a resource set used to transmit a zero-power CSI-RS (ZP CSI-RS).

9. The communications apparatus according to claim 7, wherein the plurality of resource settings for interference measurement further comprise a plurality of second resource settings for interference measurement, each of the plurality of second resource settings for interference measurement is used to configure a resource set used to transmit a non-zero-power CSI-RS (NZP CSI-RS), the measurement configuration further comprises a plurality of report settings, different report settings in the plurality of report settings are associated with different resource settings in the plurality of second resource settings for interference measurement, and different report settings in the plurality of report settings are associated with different resource settings in the plurality of resource settings for channel measurement.

10. The communications apparatus according to claim 9, wherein the plurality of report settings comprise a target report setting and another report setting; and
   the transceiver is further configured to receive first indication information, wherein the first indication information is used to indicate that there is a correspondence between the target report setting and the other report setting, and the first indication information and the measurement configuration are transmitted separately or together.

11. The communications apparatus according to claim 9, wherein each of the plurality of report settings carries indication information used to indicate a redundancy version (RV).

12. The communications apparatus according to claim 7, wherein the measurement configuration further comprises a first report setting, the first report setting is associated with the plurality of resource settings for channel measurement, and the first report setting is associated with the plurality of resource settings for interference measurement.

13. A communications apparatus, comprising:
- a processor, configured to generate a measurement configuration, wherein the measurement configuration comprises a plurality of resource settings, and the plurality of resource settings comprise a plurality of resource settings for channel measurement and a plurality of resource settings for interference measurement; and
- a transceiver, configured to send the measurement configuration to a terminal device for the terminal device to perform a joint channel and interference measurement based on channel state information reference signals (CSI-RSs) on resources configured in the plurality of resource settings for channel measurement and the plurality of resource settings for interference measurement, and
- wherein the terminal device is in a coordinated transmission scenario.

14. The communications apparatus according to claim 13, wherein the plurality of resource settings for interference measurement comprise a resource set used to transmit a zero-power channel state information reference signal (ZP CSI-RS).

15. The communications apparatus according to claim 13, wherein the measurement configuration further comprises a plurality of report settings, different report settings in the plurality of report settings are associated with different resource settings in the plurality of resource settings for channel measurement, and different report settings in the plurality of report settings are associated with different resource settings in the plurality of resource settings for interference measurement.

16. The communications apparatus according to claim 15, wherein the plurality of report settings comprise a target report setting and another report setting; and
- the transceiver is further configured to send first indication information to the terminal device, wherein the first indication information is used to indicate that there is a correspondence between the target report setting and the other report setting, and the first indication information and the measurement configuration are transmitted separately or together.

17. The communications apparatus according to claim 15, wherein each of the plurality of report settings carries indication information used to indicate a redundancy version (RV).

18. The communications apparatus according to claim 13, wherein the measurement configuration comprises a first report setting, the first report setting is associated with the plurality of resource settings for channel measurement, and the first report setting is associated with the plurality of resource settings for interference measurement.

* * * * *